(12) United States Patent
Yoshida et al.

(10) Patent No.: US 10,072,314 B2
(45) Date of Patent: Sep. 11, 2018

(54) ROUGHLY SHAPED MATERIAL FOR INDUCTION HARDENED COMPONENTS AND METHOD FOR PRODUCING SAME

(71) Applicant: NIPPON STEEL & SUMITOMO METAL CORPORATION, Chiyoda-ku, Tokyo (JP)

(72) Inventors: Suguru Yoshida, Kisarazu (JP); Tatsuya Koyama, Nishio (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 365 days.

(21) Appl. No.: 14/770,990

(22) PCT Filed: Oct. 17, 2013

(86) PCT No.: PCT/JP2013/078201
§ 371 (c)(1),
(2) Date: Aug. 27, 2015

(87) PCT Pub. No.: WO2014/136307
PCT Pub. Date: Sep. 12, 2014

(65) Prior Publication Data
US 2016/0010166 A1    Jan. 14, 2016

(30) Foreign Application Priority Data
Mar. 8, 2013 (JP) .................. 2013-047013

(51) Int. Cl.
*C21D 9/00* (2006.01)
*C21D 1/10* (2006.01)
(Continued)

(52) U.S. Cl.
CPC ................. *C21D 1/10* (2013.01); *C21D 1/06* (2013.01); *C21D 1/74* (2013.01); *C21D 9/00* (2013.01);
(Continued)

(58) Field of Classification Search
CPC ........... C21D 1/10; C22C 38/60; C22C 38/34; C22C 38/32; C22C 38/28; C22C 38/26;
(Continued)

(56) References Cited

U.S. PATENT DOCUMENTS

2011/0274578 A1  11/2011  Mizuno et al.
2012/0279616 A1  11/2012  Miyanishi et al.
2013/0180626 A1  7/2013   Yoshida

FOREIGN PATENT DOCUMENTS

CN  102741440 A   10/2012
EP  2287360 A1    2/2011
(Continued)

OTHER PUBLICATIONS

Extended European Search Report for European Application No. 13877175.3, dated Oct. 27, 2016.
(Continued)

*Primary Examiner* — Jessee Roe
(74) *Attorney, Agent, or Firm* — Birch, Stewart, Kolasch & Birch, LLP

(57) ABSTRACT

A Roughly shaped material for induction hardened components including: a. steel as a base metal including, as a chemical composition, by mass %, C: 0.35% to 0.6%, Si: 0.02% to 2.0%, Mn: 0.35% to 1.5%, Al: 0.001% to 0.5%, Cr: 0.05% to 2.0%, S: 0.0001% to 0.05%, N: 0.003% to 0.0120%, P: 0.03% or less, O: 0.0050% or less, an iron nitride layer having a thickness of 0.1 μm to 50 μm in a depth direction is formed at a surface, and a volume fraction of a γ' phase, which is a Fe nitride, in the iron nitride layer, is 80% or more.

16 Claims, 1 Drawing Sheet

(51) Int. Cl.
- *C21D 9/32* (2006.01)
- *C21D 9/40* (2006.01)
- *C23C 8/18* (2006.01)
- *C23C 8/26* (2006.01)
- *C23C 8/34* (2006.01)
- *C23C 8/80* (2006.01)
- *C21D 1/06* (2006.01)
- *C22C 38/60* (2006.01)
- *C22C 38/00* (2006.01)
- *C22C 38/02* (2006.01)
- *C22C 38/04* (2006.01)
- *C22C 38/06* (2006.01)
- *C22C 38/22* (2006.01)
- *C22C 38/24* (2006.01)
- *C22C 38/26* (2006.01)
- *C22C 38/28* (2006.01)
- *C22C 38/32* (2006.01)
- *C22C 38/42* (2006.01)
- *C22C 38/44* (2006.01)
- *C22C 38/46* (2006.01)
- *C22C 38/48* (2006.01)
- *C22C 38/50* (2006.01)
- *C21D 1/74* (2006.01)
- *C22C 38/34* (2006.01)

(52) U.S. Cl.
CPC ............... *C21D 9/32* (2013.01); *C21D 9/40* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/60* (2013.01); *C23C 8/18* (2013.01); *C23C 8/26* (2013.01); *C23C 8/34* (2013.01); *C23C 8/80* (2013.01); *Y02P 10/253* (2015.11)

(58) Field of Classification Search
CPC ......... C22C 38/24; C22C 38/22; C22C 38/06; C22C 38/04; C23C 8/26; C23C 8/32
See application file for complete search history.

(56) References Cited

FOREIGN PATENT DOCUMENTS

| | | |
|---|---|---|
| EP | 2679701 A1 | 1/2014 |
| JP | 04-000363 | 1/1992 |
| JP | 06-033219 | 2/1994 |
| JP | 06-172961 | 6/1994 |
| JP | 07-090364 | 4/1995 |
| JP | 2005-271102 | 10/2005 |
| JP | 2007-077411 | 3/2007 |
| JP | 2009-280838 | 12/2009 |
| JP | 2011-032536 | 2/2011 |
| JP | 2011-208250 A1 | 10/2011 |
| JP | 2012-225203 A | 11/2012 |
| WO | WO 2010/082685 | 7/2010 |
| WO | WO 2012/056785 | 5/2012 |
| WO | WO 2012/115135 | 8/2012 |

OTHER PUBLICATIONS

Chinese Office Action and Search Report for Chinese Application No. 201380074002.9, dated Aug. 25, 2016, with an English translation.

Office Action dated Dec. 15, 2015 issued in corresponding Japanese Application No. 2015-504120.

International Search Report dated Jan. 14, 2014 issued in corresponding PCT Application No. PCT/JP2013/078201 [with English Translation].

ROUGHLY SHAPED MATERIAL FOR INDUCTION HARDENED COMPONENTS AND METHOD FOR PRODUCING SAME

TECHNICAL FIELD OF THE INVENTION

This application is a national stage application of International Application No. PCT/JP2013/078201, filed Oct. 17, 2013, which claims priority to Japanese Patent Application No. 2013-047013, filed Mar. 8, 2013, the contents of which are incorporated herein by reference.

The present invention relates to an induction hardened component on which induction hardening is performed, a Roughly shaped material thereof, and a method for producing the same. Particularly, the present invention relates to a Roughly shaped material for components that can be applied to power transmission parts of automobiles and the like and have high surface fatigue strength, for example, induction hardened components such as gears, continuously variable transmissions, constant velocity joints, hubs, and bearings, and a method for producing the same.

RELATED ART

Power transmission parts such as gears of automatic transmissions and sheaves of continuously variable transmissions, constant velocity joints, and hubs are required to have high surface fatigue strength. Conventionally, JIS SCr420, SCM420, and other case hardening steel including around 0.2% of C have been generally used as a base metal in the above-described components, and a hardened layer of a martensite including around 0.8% of C is formed on the surface of the component by carburizing and quenching treatment so as to increase the surface fatigue strength in use. However, carburizing and quenching is a treatment which takes a long time of 5 hours to 10 hours, in some cases longer than 10 hours, along with the austenite transformation at a high temperature of around 950° C., and thus deformation by heat treatment (quenching strain) due to the crystal grain coarsening unavoidably becomes greater. For this reason, when components for which a high dimensional precision has been demanded have to be performed finish-machining such as grinding, honing, and the like after carburizing and quenching.

Further, the components such as gears are required to have high bending fatigue strength in addition to high surface fatigue strength properties in many cases. For example, in the case of a gear, strength against bending fatigue fracture at a tooth root due to overload is required. In recent years, there has been a growing need for improving fuel efficiency by reducing component weight from the viewpoint of reducing a load on the global environment, and in order to satisfy this need, a component achieving high-strengthening that is, higher surface fatigue strength and higher bending fatigue strength compared to conventional ones is required.

In order to satisfy the requirements, it has been considered to incorporate development of steel having excellent properties such as bending fatigue strength, surface fatigue strength, and corrosion resistance and new heat treatment methods such as induction hardening and nitriding into a conventional method of performing carburizing treatment using JIS SCr420, SCM420, and other carburized steel.

Since only the necessary part of the surface is heated and hardened in induction hardening, it is possible to obtain a component whose surface is effectively hardened compared to in a carburizing process. However, in order to obtain a hardness equivalent to that of a carburized and quenched material with only induction hardening, it is required to include 0.8% or more of C to the steel. The hardness of the inside of the material, which is unnecessary for improvement of the surface fatigue strength, rises as well and significant deterioration of the machinability occurs. Therefore, it is not possible to just increase the amount of C in the steel without proper consideration, and there is a limitation on improving the surface fatigue strength with only induction hardening.

Nitriding is a surface hardening method which mainly causes nitrogen to diffuse and permeate into the surface of the steel in the temperature region below the transformation point of about 500° C. to 600° C. so as to form a hardened layer. In addition, soft nitriding is a surface hardening method which causes nitrogen and carbon to diffuse and permeate into the surface of the steel at the same time so as to form a hardened layer. Also, soft nitriding is a surface hardening method which improves the wear resistance, seizure resistance, fatigue resistance, and the like. The diffused nitrogen forms nitrides in the steel in the surface of the steel. Generally, an iron nitride layer, mainly composed of $Fe_3N$ (hereinafter, sometimes referred to as ε), $Fe_4N$ (hereinafter, sometimes referred to as γ'), and other Fe nitrides, is formed on the outermost layer of the steel, and a nitrogen diffusion layer into which N is diffused is formed inside of the compound layer.

Since nitriding can be performed at a low temperature, compared with the case of carburizing, nitriding is often applied to components where low strain is required. Further, the nitrogen concentration in the surface of the steel which has been nitrided is increased and corrosion resistance is improved. However, the hardened layer depth is small with only nitriding treatment. Thus, application to a transmission gear or the like at which a high surface pressure is applied is difficult.

In recent years as a method for making up for defects in induction hardening and nitriding and obtaining better mechanical properties, particularly, improving surface fatigue strength, performing induction hardening after nitriding has been experimented with.

Patent Document 1 proposes a method of combining induction hardening and gas soft nitriding to make up for the defects thereof and improve resistance to temper softening to obtain excellent mechanical properties, particularly, high surface fatigue strength. However, in this proposal, surface hardness is high, but the N concentration in the nitrided layer is low. Thus, the high temperature hardness is low, and a sufficient resistance to temper softening at the surface of gears and the like which have a high temperature during operation cannot be obtained. As a result, it is not possible to obtain high surface fatigue strength. In addition, at the time of induction hardening, the influence of denitrification and oxidation from the iron nitride layer (phase mainly composed of ε before induction hardening) cannot be avoided and due to the influence, the structure of the surface becomes heterogeneous. Thus, there is a concern of causing deterioration in bending fatigue strength.

Patent Document 2 proposes a method for producing a component for mechanical structure having excellent mechanical strength by combining induction hardening with gas soft nitriding. In this proposal, induction heating at 900° C. or higher and 1200° C. or lower for a solid solution of nitrides is defined. However, since the amounts of added elements with a high affinity with N which promote decomposition and diffusion of nitrides is not sufficient, high temperature heating has to be performed. Therefore, an oxide layer is remarkably formed on the surface of the steel and particularly significant deterioration in bending fatigue strength is predicted. In addition, since a method for forming a thick iron nitride layer is not considered good surface fatigue strength cannot be obtained at a high surface pressure.

Patent Document 3 proposes a technique of combining induction hardening and gas soil nitriding to obtain excellent mechanical properties. However, the gas soft nitriding in this proposal is performed at a high temperature of 600° C. or higher, the iron nitride layer is thin, and further the N concentration in the compound layer is low. In addition, the amount of N which is decomposed and diffused at the time of induction hardening is also small. Even when an iron nitride layer can be formed by the gas soft nitriding, it is difficult to form a nitriding layer having a large thickness and a high N concentration. Therefore, it is not possible to form a nitriding layer having high resistance to temper softening and good surface fatigue strength even when induction hardening and gas soft nitriding are performed in a combined manner.

Patent Document 4 proposes a component for mechanical structure having excellent mechanical strength and excellent machinability which is obtained by performing induction hardening after soft nitriding treatment, and achieving a proper balance between Mn and S. Also, in this patent, similar to the problem in Patent Document 1, at the time of induction hardening, the influence of denitrification and oxidation from the iron nitride layer (phase mainly composed of ε before induction hardening) cannot be avoided and due to the influence, the surface structure becomes nonuniform. Thus, there is a concern of causing deterioration in bending fatigue strength.

In Patent Document 5, a uniform surface structure is achieved and bending fatigue strength is improved by performing oxidation preventing treatment by chemical film after salt bath soft nitriding so as to eliminate the influence of denitrification and oxidation in the subsequent induction hardening as much as possible. However, the oxidation preventing treatment by chemical film is limited such that the maximum heating temperature in induction hardening is limited to 880° C., the time for reaching the maximum heating temperature is limited to 0.6 seconds to 2.0 seconds. In addition, the hardening has to be performed at a low temperature in a short time compared to typical induction hardening in which the required maximum heating temperature is limited to 900° C. or higher and the required time for reaching the maximum heating temperature is limited to 3 seconds or longer. Therefore, it is required to perform pre-tempering on the base metal (carbon distribution homogenization by hardening) before heat treatment and there is a technical problem for ensuring surface fatigue strength in which it is difficult to obtain a proper hardened layer depth (for example, ensuring a region having Hv 550 or more to a depth of 1.5 mm from the surface). Thus, components to which the steel can be applied in terms of both performance and cost performance are limited.

In Patent Document 6, in order to suppress surface oxidation of steel at the time of induction hardening, induction hardening is performed in an ammonia gas atmosphere, an inert gas atmosphere, a reducing gas atmosphere or a combination thereof, a low oxygen atmosphere or a vacuum atmosphere, as an induction hardening atmosphere. This method is effective to suppress surface oxidation. However, a phase change resulting from denitrification at the time of induction hardening (ε changes into austenite by heating, and into martensite and residual austenite by further hardening) is unavoidable and a heterogeneous structure of the surface cannot be avoided. In addition, when the atmosphere of the induction hardening is controlled, there is a concern of deteriorating working efficiency, cost performance, and the like.

PRIOR ART DOCUMENT

Patent Document

[Patent Document 1] Japanese Unexamined Patent Application, First Publication No. H6-172961
[Patent Document 2] Japanese Unexamined Patent Application, First Publication No. H7-90364
[Patent Document 3] Japanese Unexamined Patent Application, First Publication No. 2007-77411
[Patent Document 4] PCT International Publication No. WO2010-082685
[Patent Document 5] Japanese Unexamined Patent Application, First Publication No. 2009-280838
[Patent Document 6] Japanese Unexamined Patent Application, First Publication No. 2011-032536

DISCLOSURE OF THE INVENTION

Problems to be Solved by the Invention

The present invention, in view of the above situation, is to ensure high bending and surface fatigue strength by finding a structure in which oxidation and nitriding can be suppressed and an implementation method thereof while particularly relaxing the control conditions described in Patent Document 5 in a heat treatment process in which nitriding and induction hardening are combined, particularly, regarding heat treatment of induction hardening.

That is, an object of the present invention is to provide a Roughly shaped material for induction hardened components having high surface fatigue strength and excellent bending fatigue strength while further achieving high surface hardness, inner hardness, resistance to temper softening, and machinability, which are not achieved in a conventional component by making up for defects of low surface hardness and inner hardness with only nitriding, and a method for producing the same.

Means for Solving the Problem

In order to improve the surface fatigue strength of a component, it is effective to improve the surface hardness, ensure a proper hardened layer depth and improve resistance to temper softening for maintaining high temperature strength at an operation surface whose temperature rises to at most about 300° C. during operation.

Regarding the surface hardness, a hardness of 700 Hv or more in Vickers hardness can be obtained at a depth of 50 μm from the surface by performing induction hardening on steel including 0.35 mass % or more of C in a state in which nitrogen intrudes into the steel by nitriding. Compared to the case in which induction hardening is performed on steel without nitriding, the surface hardness can be increased to 30 Hv to 50 Hv or more in Vickers hardness.

The hardened layer depth is controlled by induction hardening conditions. However, even when chemical film treatment for preventing oxidation is performed, in the case in which heating is performed at high temperature or for a long time, surface softening by denitrification or oxidation at the time of induction hardening cannot be avoided. Accordingly, as long as the induction hardening conditions are not relaxed (lowering the highest temperature at the time of hardening, heating in a short time, and the like), the structure after induction hardening cannot be made homogeneous. When the structure after induction hardening is heterogeneous, surface properties are not smooth due to nonuniform surface hardness, crack initiation caused by a volume change resulting from denitrification and oxidation and the like, which causes deterioration in bending fatigue strength. However, in the technique of the present invention, by using an iron nitride layer mainly composed of γ' (gamma prime: $Fe_4N$) as the iron nitride layer of the surface, denitrification and oxidation are suppressed. In addition, the suppression of nitriding and oxidation is further remarkably strengthened by performing heat treatment in a steam atmosphere before induction hardening, and forming a dense oxidation film of magnetite ($Fe_3O_4$) on the surface of the steel. Further, depending on conditions, the oxidation film can be used for reducing the thickness of the iron nitride layer and improving bending fatigue strength.

At the operation surface of power transmission parts such as gears, even in a lubricated environment, the temperature rises to around 300° C. by friction such as slip. At this time, the hardness of the steel is deteriorated by the effect of tempering and the surface fatigue strength of the component is deteriorated. The nitrogen intruding into the surface by nitriding has the effect of preventing this softening.

The present invention has been completed based on the above findings and the gist thereof is as follows.

(1) According to the first aspect of the present invention, a Roughly shaped material for induction hardened components includes: a steel as a base metal consisting of as a chemical composition, by mass %, C: 0.35% to 0.6%, Si: 0.02% to 2.0%, Mn: 0.35% to 1.5%, Al: 0.001% to 0.5%, Cr: 0.05% to 2.0%, S: 0.0001% to 0.05%, N: 0.003% to 0.0120%, P: 0.03% or less, O: 0.0050% or less, B: 0% to 0.005%, W: 0% to 0.5%, Mo: 0% to 1.0%, V: 0% to 1.0%, Nb: 0% to 0.3%, Ti: 0% to 0.7%, Zr: 0% to 0.05%, Sb: 0% to 0.1%, Sn: 0% to 0.1%, Cu: 0% to 2.0%, Ni: 0% to 7.0%, Ca: 0% to 0.01%, Mg: 0% to 0.01%, Te: 0% to 0.1%, and the balance consisting of Fe and impurities, wherein an iron nitride layer having a thickness of 0.1 μm to 50 μm in a depth direction is formed at a surface, and a volume fraction of a γ' phase, which is a Fe nitride, in the iron nitride layer, is 80% or more.

(2) In the Roughly shaped material for induction hardened components according to (1), further including: a magnetite coating film having a thickness of 0.1 μm to 5 μm on a surface of the iron nitride layer.

(3) In the Roughly shaped material for induction hardened components according to (1) or (2), the steel as the base metal may include, as a chemical composition, by mass %, one or more of B: 0.0003% to 0.005%, W: 0.0025% to 0.5%, Mo: 0.05% to 1.0%, V: 0.05% to 1.0%, Nb: 0.00.5% to 0.3%, Ti: 0.005% to 0.2%, and Zr: 0.0005% to 0.05%.

(4) In the Roughly shaped material for induction hardened components according to any one of (1) to (3), the steel as the base metal may include, as a chemical composition, by mass %, one or more of Sb: 0.0005% to 0.1%, Sn: 0.01% to 0.1%, Cu: 0.01% to 2.0%, and Ni: 0.01% to 2.0%

(5) In the Roughly shaped material for induction hardened components according to any one of (1) to (4), the steel as the base metal may include, as a chemical composition, by mass %, one or more of Ca: 0.0005% to 0.01%, Mg: 0.0005% to 0.01%, and Te: 0.0005% to 0.1%.

(6) According to second aspect of the present invention induction hardened component may be obtained by performing an induction hardening on the Roughly shaped material according to any one of (1) to (5).

(7) According to third aspect of the present invention, a method for producing an induction hardened component may include: performing an induction hardening on the Roughly shaped material according to any one of (1) to (5).

(8) In the induction hardened component according to (6), a number of pores having an equivalent circle diameter of 0.5 μm to 1 μm in a region at a maximum depth of 5 μm from a surface of the induction hardened component may be less than 500 per $mm^2$.

(9) According to fourth aspect of the invention, a method for producing a Roughly shaped material for induction hardened components may include: when a gas nitriding treatment is performed on a steel having a chemical composition of the steel as a base metal according to any one of (1), and (3) to (5), adjusting a composition of an atmosphere gas including $NH_3$; and performing a gas nitriding at a temperature of 500° C. to 600° C. for 30 minutes or longer in the atmosphere gas not including $CO_2$ with a nitriding potential $K_N$ satisfying the following Expression a, $$-1.4 \times (T-773)/100 + 2.0 \geq K_N \geq -0.15 \times (T-773)/100 + 0.3 \quad (a),$$

here, $K_N = P_{NH3}/P_{H2}^{3/2}$ ($P_{NH3}$ represents a partial pressure of $NH_3$ in the atmosphere gas, and $P_{H2}$ represents a partial pressure of $H_2$ m the atmosphere gas), and T represents a gas nitriding treatment temperature (K).

(10) In the method for producing a Roughly shaped material for induction hardened components according to (9), further including: performing a heat treatment under conditions of heating at 450° C. to 550° C. for 30 minutes to 60 minutes in a steam atmosphere after performing the gas nitriding.

(11) According to fifth aspect of the invention, there is provided a method for producing an induction hardened component when an induction hardening is performed on the Roughly shaped material obtained by the production method according to (9) or (10), a heating time from a time when a surface temperature of the Roughly shaped material reaches a temperature which is 50° C. lower than a hardening temperature to the induction hardening is set to be within 10 seconds, and the hardening temperature is 50° C. to 1000° C.

Effects of the Invention

According to the respective aspects of the present invention is possible to provide a Roughly shaped material for induction hardened components that can be applied to power transmission parts of automobiles and the like and have high surface fatigue strength and bending fatigue strength, for example, induction hardened components such as gears, continuously variable transmissions, constant velocity joints, hubs, and bearings, and a method for producing the same. Thus, the present invention significantly contributes to the higher output and lower cost of automobiles, and the like.

EMBODIMENTS OF THE INVENTION

Figure 1:
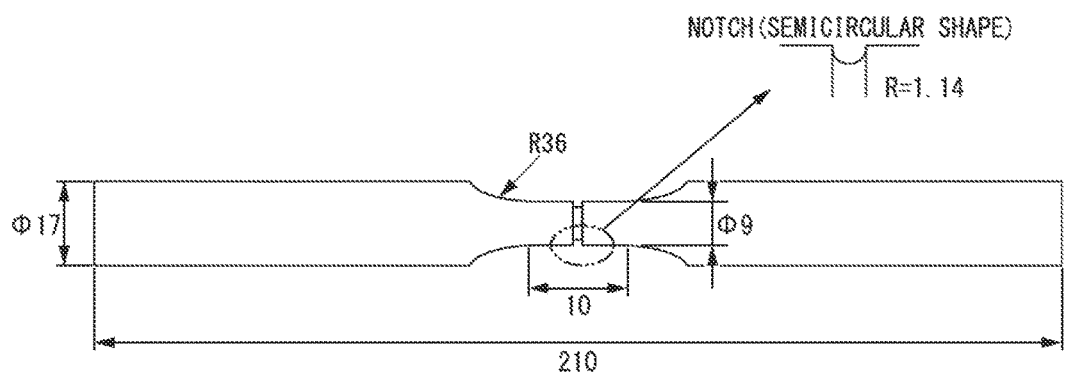
FIG. 1 is a view showing a size of a notched test piece provided for an Ono type rotating bending fatigue test.

In the present invention, an iron nitride layer 3 mainly composed of γ' (gamma prime: $Fe_4N$) which is a Fe nitride is formed in a surface which is a Roughly shaped material for power transmission parts by nitriding treatment to suppress denitrification and oxidation at the time of induction hardening. In addition, nitriding and oxidation are thither effectively suppressed at the time of induction hardening by performing heat treatment in a steam atmosphere before induction hardening, and forming a dense oxidation film of magnetite ($Fe_3O_4$) on the surface of the Roughly shaped material so as to improve bending fatigue strength and surface fatigue strength.

In the present invention, when a deep nitriding layer 1 having high N concentration is formed by performing induction hardening after nitriding, hardness and resistance to temper softening can be improved. Based on the above findings, the invention has been completed.

First, the reasons for restricting the necessarily added elements for a component and a Roughly shaped material thereof according to the present invention will be explained. In addition, mass % in the chemical composition will be simply expressed as % in the following description.

<C: 0.35% to 0.6%>

C is an important element for obtaining the strength of steel. Particularly, C is an essential element which is required for reducing the ferrite fraction of the structure before induction hardening, improving the hardenability at the time of induction hardening, and increasing the hardened layer depth. However, when the amount of C is less than 0.35%, the ferrite fraction is high and the hardening at the time of induction hardening is not sufficient. Thus, the amount of C is set to 0.35% or more. The amount of C is preferably 0.45% or more and more preferably 0.50%. On the other hand, when the amount of C added is excessive, the machinability and the forgeability are remarkably impaired and further the possibility of quenching cracks initiating at the time of induction hardening increases. Thus, the amount of C is set to 0.6% or less.

<Si: 0.02% to 2.0%>

Si has the effect of increasing the resistance to temper softening of the hardened layer to improve the surface fatigue strength. In order to obtain the effect, the amount of Si is set to 0.02% or more. The amount of Si is preferably 0.25% or more. On the other hand, when the amount of Si is more than 2.0%, the decarburization at the time of forging becomes significant. Thus, the amount of Si is set to 2.0% or less.

<Mn: 0.35% to 1.5%>

Mn is an element effective for improving the hardenability and increasing the resistance to temper softening to improve the surface fatigue strength. Since this effect can be obtained when the amount of Mn is 0.35% or more, the amount of Mn is set to 0.35% or more. The amount of Mn is preferably 0.6% or more. In addition, S is concentrated at the surface of the steel to thereby inhibit the intrusion of N into the steel. However, Mn prevents the effect of inhibiting the intrusion of N by S by immobilizing S in the steel as MnS and promotes the formation of a thick iron nitride layer 3 by nitriding. In order to obtain that effect, it is preferable to satisfy Mn/S≥70. However, when the amount of Mn is more than 1.5%, the hardness of a base metal 7 increases significantly and the machinability before nitriding is remarkably deteriorated. Therefore, the amount of Mn is set to 1.5% or less.

<Al: 0.001% to 0.5%>

Al is an element which precipitates and disperses in the steel as nitrides, effectively acts to refine the grains of the austenite at the time of induction hardening, and further improves the hardenability to increase the hardened layer depth. In addition, Al is an element which is effective for improving the machinability. Therefore, the amount of Al is set to 0.001% or more. The amount of Al is preferably 0.01% or more. Further, Al is an element which has the effect of increasing the N concentration of the surface by forming compounds with N at the time of nitriding and is effective for improving the surface fatigue strength. Therefore, the amount of Al is set to 0.001% or more. However, when the amount of Al is more than 0.5%, it is not easy to complete austenite transformation at the time of induction heating and hardening is not sufficiently performed. Thus, the amount of Al is set to 0.5% or less.

<Cr: 0.05% to 2.0%>

Cr has the effect of improving the nitriding properties and the resistance to temper softening to improve the surface fatigue strength. Since this effect can be obtained when the amount of Cr is 0.05% or more, the amount of Cr is set to 0.05% or more. The amount of Cr is preferably 0.2% or more. The amount of Cr is more preferably 0.4% or more. However, when the amount of Cr is more than 2.0%, the machinability is deteriorated and thereby the amount of Cr is set to 2.0% or less. Further, when the amount of Cr is 0.05% or more in the case of adding Sn to the steel, the surface fatigue strength in a corrosive environment is further improved.

<S: 0.0001% to 0.05%>

S has the effect of improving the machinability On the other hand, S is an element that inhibits nitriding by concentrating at the surface of the steel at the time of nitriding to thereby inhibit the intrusion of N into the steel. When the amount of S is more than 0.05%, an inhibition of nitriding becomes significant and further the forgeability is also deteriorated. Accordingly, to improve the machinability, when including S, it is necessary to set the amount of S to 0.05% or less. On the other hand, the lower limit of the amount of S is set to the industrial limit of 0.0001%.

<N: 0.003% to 0.0120%>

When excessive N is added, the hardness rises. Further, N and Al bond to form AlN, whereby the amount of solid-soluted Al effective for improvement of the machinability is reduced. Thus, the machinability is deteriorated. In addition, N which is excessively added to the steel causes a deterioration of the ductility in a high temperature region. Furthermore, N which is excessively added to the steel forms coarse AlN or coarse BN, so makes the base metal 7 remarkably brittle. Thus, cracks are initiated at the time of rolling and forging. Accordingly, the amount of N has to be limited to 0.0120% or less. On the other hand. N forms various nitrides and is effective for refining the grains of the austenite at the time of induction hardening. Therefore, the amount of N is set to 0.003% or more.

<P: 0.03% or less>

P is included as an impurity and segregates at the grain boundaries to cause a deterioration of the toughness. Thus, the amount of P has to be reduced as much as possible and the smaller the amount of P is, the more preferable it is. The amount of P has to be limited to 0.03% or less. The lower limit of the amount of P is set to the industrial limit of 0.0001%.

<O: 0.0050% or less>

O is present in the steel as oxide-based inclusions such as $Al_2O_3$ and $SiO_2$, but when the amount of O is excessive, such oxides become large in size. Such enlarged oxides function as the origin for breaking of power transmission parts, so the smaller the amount of O is, the more preferable it is. Thus, the content of O has to be limited to 0.0050% or less. The amount of O is desirably 0.0020% or less and more desirably 0.0015% or less. The lower limit of the amount of O is set to the industrial limit of 0.0001%.

Next, the reasons for restricting optionally elements which are added will be explained.

[Elements for Strengthening Steel]

The component and the Roughly shaped material thereof according to the present invention may further include one or more of elements for strengthening steel shown below.

<B: 0% to 0.005%>

B bonds to N in the steel and separates as BN to contribute to improving the machinability. At the time of induction heating, BN is decomposed and releases B. This significantly improves the hardenability and contributes to improving the surface fatigue strength. In order to reliably obtain the effect of addition of B, the amount of B is preferably 0.0003% or more. However, when the amount of B is more than 0.005%, the effect is saturated and further, cracking is caused at the time of rolling and forging. Thus, the amount of B is set to 0% to 0.005%.

<W: 0% to 0.5%>

W is an element which improves the hardenability and thereby improves the surface fatigue strength. In order to reliably obtain the effect of addition of W, the amount of W is preferably 0.0025% or more. When the amount of W is more than 0.5%, the machinability is deteriorated. Thus, the amount of W is set to 0% to 0.5%. On the other hand, in order to more reliably obtain the effect of improving the hardenability by addition of W, the amount of W is preferably 0.01% or more and more preferably 0.03% or more.

<Mo: 0% to 1.0%>

When Mo is added, Mo has the effect of improving the resistance to temper softening of the hardened layer and improving the surface fatigue strength. Mo also has the effect of toughening the hardened layer to improve the bending fatigue strength. In order to reliably obtain the effect of addition of Mo, the amount of Mo is preferably 0.05% or more. However, when the amount of Mo, is added more than 1.0%, the effects are saturated and cost performance is impaired. Thus, the amount of Mo is set to 0% to 1.0%.

<V: 0% to 1.0%>

When V is added, V precipitates and disperses as nitrides in the steel and is effective for refining the grains of the austenite at the time of induction hardening. In order to reliably exhibit the effect of addition of V the amount of V has to added 0.05% or more. However, when the amount of V is added more than 1.0%, that effect is saturated and cost performance is impaired. Thus, the amount of V is set to 0% to 1.0%.

<Nb: 0% to 0.3%>

When Nb is added, Nb precipitates and disperses as nitrides in the steel and is effective for refining the grains of the austenite at the time of induction hardening. hi order to reliably exhibit the effect of addition of Nb, the amount of Nb is preferably added 0.005% or more. However, when the amount of Nb is added more than 0.3%, the effect is saturated and cost performance is impaired. Thus, the amount of Nb is set to 0% to 0.3%.

<Ti: 0% to 0.2%>

Ti precipitates and disperses as nitrides in the steel and is effective for refining the grains of the austenite at the time of induction hardening. In order to reliably exhibit the effect of addition of Ti, the amount of Ti is preferably 0.005% or more. However, when the amount of Ti is more than 0.2%, the precipitates are coarsened and cause the steel to become brittle. Thus, the amount of Ti is set to 0% to 0.2%.

<Zr: 0% to 0.05%>

Zr precipitates and disperses as nitrides in the steel and is effective for refining the grains of the austenite at the time of induction hardening. In order to reliably exhibit the effect of addition of Zr, the amount of Zr is preferably 0.0005% or more. However, when the amount of Zr is more than 0.05%, the precipitates are coarsened and cause the steel to become brittle. Thus, the amount of Zr is set to 0% to 0.05%.

[Elements for Improving Bending Fatigue Strength by Oxidation Suppression]

The component and the Roughly shaped material thereof according to the present invention may further include one or more of elements for improving bending fatigue strength by oxidation suppression shown below.

<Sb: 0% to 0.1%>

Sb is an element having a strong tendency for surface segregation and is an effective: element for preventing oxidation by adsorbing oxygen from the outside. In order to reliably exhibit the effect of preventing oxidation by addition of Sb, the amount of Sb is preferably 0.0005% or more. However, when the amount of Sb is more than 0.1%, the effect is saturated. Thus, the amount of Sb is set to 0% to 0.1% in consideration of efficiency.

<Sn: 0% to 0.1%>

Sn improves the corrosion resistance by addition alone or in combination with Cr. In order to reliably exhibit the effect of improving the corrosion resistance by addition of Sn, the amount of Sn is preferably 0.01% or more. In addition, the reason for setting the upper limit of the Sn concentration is that when an excessive amount of Sn is added, hot ductility is deteriorated and flaws are generated in casting and rolling at the time of steel production. Therefore, the amount of Sn is set to 0% to 0.1% in a range in which deterioration of hot ductility is allowable.

<Cu: 0% to 2.0%>

Cu concentrates on the surface of the steel along with the progress of oxidation and has the effect of suppressing subsequent oxidation reactions. In order to reliably exhibit the effect of addition of Cu, the amount of Cu is preferably added 0.01% or more. On the other hand, when the amount of Cu is added more than 2.0%, from the viewpoint of mechanical properties, the effect is saturated. Thus, the amount of Cu is set to 0% to 2.0%. Particularly excessive addition of Cu deteriorates the hot ductility and easily causes flaws at the time of rolling.

<Ni: 0% to 2.0%>

When Ni is added to the steel, similar to Cu, Ni concentrates on the surface of the steel along with the progress of oxidation and has the effect of suppressing subsequent oxidation reactions. In order to reliably exhibit the effect of addition of Ni, the amount of Ni is preferably added 0.01% or more. On the other hand, when the amount of Ni is more than 2.0%, the machinability is deteriorated and thus the amount of Ni is set to 0% to 2.0%. In addition, Ni functions as an element for improving hot ductility and suppresses deterioration of hot ductility in the case of adding Cu and Sn to the steel. It is preferable that the following Expression 2 including Sn and Cu is satisfied in the effect.

$$0.12 \times Cu + Sn - 0.1 \times Ni \leq 0.15 \quad (2)$$

[Elements for Improving Bending Fatigue Strength by Refinement of Sulfide]

The component and the Roughly shaped material thereof according to the present invention may thither include elements for improving bending fatigue strength by refinement of sulfide shown below in the case of requiring improvement of the bending fatigue strength of the component.

<Ca: 0% to 0.01%>
<Mg: 0% to 0.01%>
<Te: 0% to 0.1%>

Ca, Mg and Te are all elements which suppress the elongation of MnS and further improve the bending fatigue strength. However, When the amount of the each element is added more than the above amounts, the effect is saturated and cost performance is impaired. Thus, the amount of Ca is set to 0% to 0.01%, the amount of Mg is set to 0% to 0.01%, and the amount of Te is set to 0% to 0.1%. In order to reliably obtain the effect of suppressing elongation of MnS, the lower limit of the amount of Ca is preferably 0.0005%, the lower limit of the amount of Mg is preferably 0.0005%, and the lower limit of the amount of Te is preferably 0.0005%.

The balance of the induction hardened component and the Roughly shaped material thereof according to the present invention, that is, elements other than the above-described elements, include iron and impurities. Here, it is noted that the impurities refer to elements which are incorporated from ores or raw materials such as scrap, or incorporated from various production environments when the steel is industrially produced. The impurities are allowable within a range not having an adverse effect on the present invention.

At the time of nitriding, the iron nitride layer 3 to be formed in the surface includes a γ' phase (gamma prime: $Fe_4N$) and an ε phase ($Fe_{2-3}N$). The diffusion of N into the ε phase is about 30 times faster than the diffusion of N into the γ' phase. In the ε phase, the diffusion rate of N is fast and the diffusion of N to the external atmosphere from the iron nitride layer 3, so-called denitrification becomes significant. On the other hand, since the diffusion of N into the γ' phase is slow, denitrification does not easily occur Accordingly, at the time of nitriding, it is desirable that the iron nitride layer 3 has a structure mainly composed of the γ' phase. Even when a part of ε phase is present, it is preferable that a small amount of the ε phase is diffused in the iron nitride layer 3.

In order to obtain such an effect, the volume fraction of the γ' phase, which is a Fe nitride, in the iron nitride layer 3 has to be 80% or more. The effect of preventing denitrification is sufficiently exhibited when the thickness of the iron nitride layer 3 is 0.1 μm or more. In addition, even when the thickness of the iron nitride layer 3 is more than 50 μm, there is no problem. However, forming the iron nitride layer 3 having a thickness of more than 50 μm in a layered shape requires much time in terms of industrial view point. Accordingly, the thickness of the iron nitride layer 3 after nitriding is set to 0.1 μm to 50 μm.

In order to form the iron nitride layer 3 at the time of nitriding into the iron nitride layer 3 mainly composed of the γ' phase, it is most important to control the nitriding potential at the nitriding treatment temperature. As a diagram showing the state of nitrides formed at the nitriding potential and the temperature condition at the time of nitriding treatment in which the vertical axis represents nitriding potential and the horizontal axis represents temperature, that is, an equilibrium diagram showing the phase formed at a temperature of the iron-nitrogen binary and the nitriding potential, a Lehrer diagram (Reference "Nitriding and Soft Nitriding of Iron", published by AGNE Gijutsu Center Inc. p. 131) is known. Generally, when the nitriding potential raises, the phase that is present in an equilibrium state changes from a state in which nitrides are precipitated in the steel to the γ' phase and from the γ' phase to the ε phase. For this reason, the inventors have found that it is effective to induce the nitriding potential to become lower than the potential of the nitriding conditions of the related art at which the ε phase is formed to form the iron nitride layer 3 into the iron nitride layer 3 mainly composed of the γ' phase. Further, as clearly seen from the Lehrer diagram, the nitriding potential for forming the γ' is changed by the nitriding treatment temperature. Accordingly, the Roughly shaped material of the present invention can he obtained by adopting a method (gas nitriding treatment method of the present invention) of, when gas nitriding treatment is performed on steel having the above chemical composition, adjusting the composition of the atmosphere gas including $NH_3$ and performing nitriding under the conditions in which a nitriding potential $K_N$ during the gas nitriding treatment satisfies the following Expression a and the steel is held at a treatment temperature of 500° C. to 600° C. for 30 minutes or longer in an atmosphere gas not, including $CO_2$.

$$-1.4\times(T-773)/100+2.0 \leq K_N \leq -0.15\times(T-773)/100+0.3 \quad (a)$$

Here, $K_N = P_{NH3}/P_{H2}^{3/2}$ ($P_{NH3}$ represents a partial pressure of $NH_3$ in the atmosphere gas and $P_{H2}$ represents a partial pressure of $H_2$ in the atmosphere gas), and T presents a gas nitriding treatment temperature (K). The Expression a is formulated as an approximate expression by quantifying boundary lines between α and γ' and γ' and ε in the Lehrer diagram.

The limitation of the nitriding potential to the range shown by the Expression a reflects the result of experimentally obtaining a region in which the γ' phase is industrially stably present based on the γ' phase stable region in the above-described Lehrer diagram.

The reason why the atmosphere gas does not include $CO_2$ is that when the atmosphere gas includes $CO_2$, a carburizing reaction occurs and in addition to nitride compounds cementite is formed in the surface so that the fatigue strength is deteriorated.

The reason for setting the treatment temperature to 500° C. to 600° C. is that when the temperature is higher than 600° C., ε nitrides are easily formed and thus γ' nitrides are not easily formed so that the iron nitride layer 3 cannot be formed into the iron nitride layer 3 mainly composed of the γ' phase. On the other hand, when the temperature is lower than 500° C., a nitriding reaction does not proceed and treatment for a long time is required. In addition, the reason for setting the nitriding treatment time to 30 minutes or longer is to allow sufficient intrusion of nitrogen into the steel along with the nitriding treatment. After sufficient nitriding treatment is performed, induction hardening is performed to improve the surface fatigue strength remarkably. The upper limit of the nitriding treatment time is not particularly limited. However, in terms of pursuing industrial production efficiency, the upper limit is desirably within the range not causing any problem and is preferably about 48 hours.

Next, in the method for producing a Roughly shaped material according to a preferred aspect, the conditions for oxidation coating treatment that is performed after gas nitriding treatment will be described.

There are several methods for oxidation coating treatment. However, in the present invention, magnetite ($Fe_3O_4$) which is a dense oxide is formed. When the surface of the steel is coated by forming magnetite on the surface of the steel, particularly, the effect of suppressing denitrification is exhibited and softening of the surface caused by denitrification can be prevented. As a method for realizing this magnetite coating, magnetite is heated to 450° C. to 550° C. in a steam atmosphere. A magnetite coating film 2 having a thickness of about 1 μm to 2 μm can be formed under the conditions in which the steel is generally held at around 500°

C. for 30 minutes to 60 minutes. Here, as long as a thickness of the magnetite coating film 2 of at least 0.1 μm or more is ensured, the thickness is sufficient to suppress denitrification. Therefore, the minimum value of the thickness of the magnetite coating film 2 is set to 0.1 μm. In addition, even when the magnetite coating film 2 is thick, there is no problem. However, in order to perform treatment for increasing the thickness, increasing the treatment time and causing the production efficiency to deteriorate may be considered. Therefore, the maximum value of the thickness of the magnetite coating film 2 is set to 5 μm Next, the induction hardening conditions will be described.

In the case in which the iron nitride layer 3 of the surface is formed into the iron nitride layer 3 mainly composed of the γ' phase, denitrification and oxidation of the surface and the smoothness as the surface properties tend to be improved at the time of induction hardening, compared to the case in which the iron nitride layer 3 is formed into the iron nitride layer 3 mainly composed of the ε phase. However, there may be a case in which denitrification and oxidation may not be completely suppressed.

Therefore, it is preferable that induction hardening is performed on the Roughly shaped material of the present invention while the hardening temperature is 850° C. to 1000° C. and the heating time from a time when the temperature reaches a temperature which is 50° C. lower than a hardening temperature to the induction hardening is set to be within 10 seconds. Here, the heating time refers to a duration in which the surface temperature is maintained after reaching a temperature 50° C. lower than the hardening temperature based on the maximum heating temperature which the surface temperature reaches at the time of hardening, and the heating time affects denitrification and oxidation of the surface. The higher the heating temperature is, the easier it is for denitrification and oxidation of the surface to occur.

When the heating time from a time when the surface temperature reaches a temperature which is 50° C. lower than a hardening temperature of the Roughly shaped material to the induction hardening temperature is longer than 10 seconds, denitrification and oxidation of the surface become significant, smoothness of the surface properties is not sufficiently ensured, and the bending fatigue strength is not improved. In order to obtain a hardened layer having a desired thickness, time for austenitizing the surface is required and the above heating time is preferably 0.5 seconds or longer. In addition, even when the hardening temperature is higher than 1000° C., denitrification and oxidation of the surface become significant, smoothness of the surface properties is not sufficiently ensured, and the bending fatigue strength is not improved. When the hardening temperature is lower than 850° C., the Roughly shaped material cannot be sufficiently hardened by induction hardening, pro-eutectoid ferrite appears and the hardness of the surface hardened layer is nonuniform. Thus, the bending fatigue strength is not improved.

When the nitriding-treated Roughly shaped material is induction hardened, there is a tendency for pores to be formed in the surface. The pores function as the origin for fatigue fracture when bending stress is repeatedly applied and causes crack propagation. Accordingly, it is desirable to prevent the pores of the surface of the induction hardened component from being formed as much as possible. Therefore, in the surface of the induction hardened component, that is, in a region to a depth of 5 μm from the surface, pores having an equivalent circle diameter of 0.5 μm to 1 μm are formed at a density less than 500 pores/mm$^2$.

It is considered that the pores are mainly formed by the following two causes. First, the pores are formed by gasification of N whose amount is more than the solid solution limit along with cooling after intrusion of N into the iron nitride layer 3 at the time of nitriding. Second, the pores are formed by denitrification from the iron nitride layer 3 and internal oxidation which occurs simultaneously with the denitrification at the time of heating in induction hardening.

Accordingly, in order to limit the number of pores, it is desirable to suppress the intrusion of an excessive amount of N. Specifically, it is desirable that the compound composition of the iron nitride layer 3 has a low N concentration, that is, the iron nitride layer 3 which is mainly composed of the γ' phase is more preferable compared to the iron nitride layer 3 which is mainly composed of the ε phase. In addition, the diffusion of N into the ε phase is about 30 times faster than the diffusion of N into the γ' phase. The diffusion rate of N into the ε phase is fast, and also the diffusion of N to the external atmosphere from the iron nitride layer 3, so-called denitrification, becomes significant. For this reason, in order to limit the number of pores, it is desirable that the iron nitride layer 3 is the iron nitride layer 3 mainly composed of the γ' phase rather than the iron nitride layer 3 mainly composed of the ε phase.

In the above-described nitriding treatment, an induction hardened component with a small number of pores in such a :surface can be obtained by selecting the conditions for easily forming γ' (nitriding temperature and nitriding, potential).

EXAMPLES

Hereinafter, the present invention will be described in detail based on examples. The conditions in the examples are one of conditions employed in order to confirm the feasibility and effects of the present invention. The present invention is not limited to the examples. The present invention can employ various conditions within the scope of the purport of the present invention as long as the objective of the present invention can be achieved.

Steels having the chemical compositions shown in Tables 1A, 1B, 1C and 3 were prepared. The cast pieces having the chemical compositions shown in Tables 1A, 1B, 1C and 3 were cut into test pieces having a thickness of 80 mm and a thermocouple was attached to the center part. These test pieces were put into an electric furnace at 1050° C., taken out from the furnace after 30 minutes from the time when the center part of the test pieces reached at 1045° C. and rolled when the surface temperature reached at 1000° C. Three passes of rolling were performed successively and the thickness was reduced from 80 mm to 64 mm, 51 mm, and 41 mm. Then, the test pieces were cooled by air cooling to room temperature to prepare steels. However, since Sn was excessively added to Steel No. bh, flaws were remarkably generated at the stage of steel production and there was a problem in manufacturability Thus, the subsequent properties evaluation was not performed. Further, regarding the level of cracking during the rolling, the test was stopped at the time when cracking occurred. Other rolled materials were cooled and then the cross sections of the rolled materials were cut to observe surface flaws. The determination of flaws was such that no flaws were observed at a depth of 100 μm or less and flaws were observed at a depth of more than 100 μm. The above test results are shown in Tables 1C and 3. However, in Table 1C, it was determined that no flaw was observed in all steels and the mechanical properties were evaluated. On the other hand, it was determined that flaws were observed in Steel No. bh in Table 3.

As roller pitching fatigue test pieces for evaluation of surface fatigue strength, small roller test pieces having a cylindrical part having a diameter of 26 mm and a width of 28 mm and large roller test pieces having a diameter of 130 mm and a width of 18 mm were cut from steel plate having a thickness of 41 mm and thus the test pieces were prepared. In addition, for investigation of resistance to temper softening, a cylindrical test piece having a diameter of 26 mm and a length of 100 mm was prepared.

The small roller test pieces and the large roller test pieces were nitrided (nitrided at each temperature for each time, then cooled by $N_2$ gas, with controlling nitriding potential by adjusting the flow rate of nitriding, gas of a composition: $N_2+NH_3$), and then induction hardened (frequency 100 kHz) in Example A. In Example B, after the test pieces were nitrided in Examples A, the heat treatment for heating for 30 minutes to 60 minutes in a steam atmosphere having a temperature of 450° C. to 550° C. was performed on the test pieces, and then induction hardening (frequency 100 kHz) was performed. The coolant used at the time of induction hardening was tap water or a polymer quenchant. After hardening, tempering was performed at 150° C. for 1 hr.

Further, as a notched test piece for an Ono type rotating bending fatigue test for evaluation of bending fatigue strength, a V-Shaped circular notched test piece having the size shown in FIG. 1 was prepared and nitriding treatment, induction hardening, and tempering or nitriding treatment, heat treatment in a steam atmosphere, induction hardening, and tempering were performed under the same conditions as those for the above roller pitching fatigue test pieces.

Figure 2:
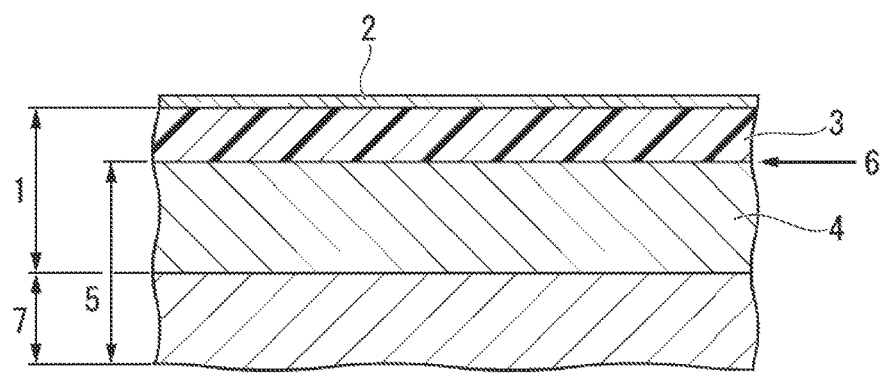
FIG. 2 is an example of a view schematically showing a. layer structure of nitriding-treated steel in an embodiment of the present invention.

As shown in FIG. 2, in the nitriding treatment among these treatments, the iron nitride layer 3 is formed in the surface and a nitrogen diffusion layer 4 is formed at the inside of the iron nitride layer under the treatment conditions. The iron nitride layer 3 is formed into an almost homogeneous film along the surface and grows. In addition, the iron nitride layer 3 has a distinct phase boundary 6 at the boundary between the iron nitride layer 3 and a primary phase 5. The depth of the phase boundary 6 from the surface is the thickness of the iron nitride layer 3. The thickness of the iron nitride layer 3 and the volume fraction of the γ' phase in the iron nitride layer 3 can be measured and calculated from phase mapping obtained as a result by observing the surface of the cross section and analyzing the phases in Electron Backscatter Diffraction (EBSD) in a scanning electron microscope into ε, γ', ferrite, and cementite. In addition, nitrogen permeates into the iron nitride layer by diffusion and a region having a high nitrogen concentration is also present in the inside of the iron nitride layer 3. A region in which the nitrogen concentration becomes equal to the nitrogen concentration before nitriding, that is, the nitrogen concentration of the base metal 7 is expressed as the nitriding layer 1. A region which is not affected by the nitrogen intruding into the steel by nitriding is expressed as the base metal 7. The nitrogen diffusion and permeation region cannot be clearly separated by an optical microscope. For example, the nitrogen concentration is measured through linear analysis by EPMLA and quantitative evaluation is performed. As both the iron nitride layer 3 and the nitriding layer 1 are treated at a higher temperature or a longer time the thickness thereof tends to increase and when the amount of elements which form a nitride is large, the thickness tends to decrease.

The outermost layer, that the dense magnetite coating film 2 is formed on the surface by performing heat treatment in a steam atmosphere after the nitriding treatment to further suppress denitrification occurring at the time of induction hardening to be performed later.

In induction heating to be perform subsequently, the iron nitride layer 3 of the surface mainly composed of a γ' compound is transformed into ε from γ'. However, at the stage of γ', denitrification and oxidation hardly occur and little denitrification and oxidation occur in a very short time from when the phase is transformed to ε to when hardening is performed. Therefore, the hardened structure is frozen in a state of ε without any change.

Regarding the pores present in the surface after the induction hardening, a region at a depth of 5 μm from the surface of the cross section was observed using an electron microscope and the number of pores was measured.

As the nitrogen concentration increases in the steel, the hardness after tempering at 150° C., and the hardness after tempering at 300° C. are improved. Particularly, it is generally known that in the roller pitching fatigue test, the durability of the steel is positively correlated with the hardness after tempering at 300° C. In the present invention, the lower limit of the hardness after tempering at 300° C. was set to a Vickers hardness of 650 as a target value.

The test piece for measuring the hardness after tempering at 300° C. was nitrided under the same conditions as those for the small roller test piece and the large roller test piece and then induction hardening (frequency 100 kHz) was performed (Examples A). In Example A, after the test piece was nitrided, under the heat treatment conditions in which the test piece was heated to 450° C. to 550° C. for 30 minutes to 60 minutes in a steam atmosphere, the magnetite coating film 2 was formed on the surface. Then, induction hardening was performed (Example B). After the induction hardening, tempering was further performed at 300° C. for 60 minutes. The test piece was sectionally cut and then the hardness distribution from the surface to the core was measured using a Vickers hardness meter. In addition, the structure of the hardened surface was martensite and the core was maintained as a ferrite-pearlite structure without being hardened. The thickness of the magnetite coating film 2 was obtained by creating an O element mapping of the surface using ERMA and measuring the thickness of a region in which the O concentration of the surface in the mapping was high as the thickness of the magnetite coating film. The thickness of the iron nitride layer 3 was measured in the same manner as in the above-described Examples. The thickness of the iron nitride layer 3 was set to a depth from the boundary between the magnetite coating film 2 and the iron nitride layer 3 to a phase boundary 6.

As shown in Tables 2B and 6C, the invention examples of Examples 1 to 46 and 70 to 115 satisfy the target level of the hardness after tempering at 300° C.

After the above heat treatment was performed, the large roller test pieces and the small roller test pieces were used for a roller pitching fatigue test of a standard surface fatigue test. The roller pitching fatigue test was performed by pushing the large roller test pieces against the small roller test pieces at various hertz stress surface pressures to make the peripheral speed directions of the two roller test pieces the same at the contact part and by making the slip ratio at the contact part —40% (the peripheral speed of the large roller test piece becomes 40% larger than the peripheral speed of the small roller test piece) for rotation. The temperature of gear oil which was fed to the contact part as lubrication oil was set to 90° C. and the contact stress between the large roller test piece and the small roller test piece was set to 3500 MPa. The cutoff number in the tests was 10000000 cycles ($10^7$ cycles). When no pitching occurred in the small roller test pieces and the number of rotations reached 10000000 cycles, it was determined that durability of the small roller test pieces was ensured. Pitching was detected by a vibration meter which was attached to the test machine. The occurrence of pitching and number of rotations were confirmed after vibration was detected, the rotation of the two rollers was stopped.

In addition, the rotation bending fatigue test was performed according to the method described in JIS Z 2274. When the number of rotations reached 10000000 cycles, it was determined that the durability was sufficient and the test was performed by obtaining fatigue limit and strength at finite life. The properties evaluation was mainly determined based on whether the value of fatigue limit was high or low.

As shown in Tables 2B and 6C, in the roller pitching fatigue test, a durability at 10000000 cycles was ensured in all of the invention examples of Examples 1 to 46 and 70 to 115 under the stress condition of 3500 MPa or more. On the other hand, in all comparative examples of Examples of 47 to 60 and 116 to 129 shown in Tables 4B and 7B excluding Examples 50, 52, 54, 55, 119, 121, 123, and 124, breaking occurred before reaching 10000000 cycles. In the roller pitching fatigue test, the roller pitching fatigue durability was not sufficient. In comparative examples of Examples of 54 and 123, a large number of flaws were generated due to the addition of Sn with the amount of more than the upper limit and thus evaluation was not performed.

Further, regarding the bending fatigue strength, in the notched Ono type rotating bending fatigue test of all of the invention examples of Examples 1 to 46 under the stress condition of 700 MPa, a durability at 10000000 cycles was ensured. In the notched Ono type rotating bending fatigue test of all of the invention examples of Examples 70 to 115, under both the stress conditions of 700 MPa and 750 MPa, a durability at 10000000 cycles was ensured. On the other hand, in all of the comparative examples of Examples 47 to 60 excluding Example 54, breaking occurred before reaching 10000000 cycles, and the durability of the notched Ono type rotating bending fatigue was not sufficient. In all of the comparative examples of Examples 116 to 129 excluding Example 123, breaking occurred before reaching 10000000 cycles, and the durability of the notched Ono type rotating bending fatigue was not sufficient.

The chemical compositions of all steels of Steel Nos. a to at shown in Tables 1A, 1B, and 1C are within the range of the chemical composition of the present invention. On the other hand, the steels of Steel Nos. ha to tin shown in Table 3 have one or more components for which there is deviation from the chemical component range defined by the present invention.

Table 4A shows the conditions when the steels having the chemical compositions shown in Table 3 were nitrided and induction hardened. In Examples 50, 52, and 55 in Table 4A, each chemical composition Shown in Table 3 deviates from the range of the present invention and also the gas nitriding treatment conditions are not compatible with the range of the present invention. As a result, as shown in Table 4B, in the surface fatigue strength evaluation and the bending fatigue strength evaluation, the hardness after tempering at 300° C. was high Thus, the steels were durable in the roller pitching fatigue test but breaking occurred before the target level of the notched Ono type rotating bending fatigue test was attained. In addition, in Example 54, since the amount of Sn which is added to a steel shown in Table 3 deviates from the range of the present invention, a large number of flaws were generated in the state before the durability evaluation test. For this reason, it was considered that a large number of flaws would also be generated in the component and thus the evaluation was not performed.

Table 7A shows the conditions when the steels having the chemical compositions shown in Table 3 were nitrided, heated in a steam atmosphere, and induction hardened. In Examples 119, 121, and 124 in Table 7A, each chemical composition shown in Table 3 deviate from the range of the present invention and also the gas nitriding treatment conditions are not compatible with the range of the present invention. As a result, as shown in Table 7B, in the surface fatigue strength evaluation and the bending fatigue strength evaluation, the hardness after tempering at 300° C. was high. Thus, the steels were durable in the roller pitching fatigue test but breaking occurred before the target level of the notched Ono type rotating bending fatigue test was attained. In addition, in Example 123, since the amount of Sn which is added to a steel shown in Table 3 deviates from the range of the present invention, a large number of flaws were generated in the state before the durability evaluation test. For this reason, it was considered that a large number of flaws would also be generated in the component and thus the evaluation was not performed.

Table 4B shows the properties of steels obtained by performing heat treatment on the steels having the chemical compositions shown in Table 3 under the conditions of Table 4A. In Examples 47, 51, 58, and 60 in Table 4B, since each Chemical composition shown in Table 3 deviate from the range of the present invention, the Vickers hardness at the time of tempering at 300° C. did not reach the target value and breaking occurred before the target levels of both the roller pitching fatigue test and the notched Ono type rotation bending fatigue test were attained. In Examples 48, 49, and 53, since each chemical composition shown in Table 3 deviate from the range of the present invention hardening was not sufficient and the portion of the surface at a depth required to obtain fatigue durability could not hardened. Thus, breaking occurred before the target levels of both the roller pitching fatigue test and the notched Ono type rotation bending fatigue test were attained. Further, in Examples 56, 57, and 59, since a large amount of crystallized and precipitated products such as oxides, sulfides, and nitrides, which affects negative impact of fatigue durability, were formed, breaking occurred before the target levels of both the roller pitching fatigue test and the notched Ono type rotation bending fatigue test were attained.

Table 7B shows the properties of steels obtained by performing heat statement on the steels having the chemical compositions shown in Table 3 under the conditions of Table 7A. In Examples 116, 120, 127 and 129 in Table 7B, since each chemical composition shown in Table 3 deviate from the range of the present invention, the Vickers hardness at the time of tempering at 300° C. did not reach the target value and breaking occurred before the target levels of both the roller pitching fatigue test and the notched Ono type rotation bending fatigue test were attained. In Examples 117, 118, and 122, since each chemical composition shown in Table 3 deviate from the range of the present invention, the hardening was not sufficient and the portion of the surface at a depth required to obtain fatigue durability could not hardened. Thus, breaking occurred before the target levels of both the roller pitching fatigue test and the notched Ono type rotation bending fatigue test were attained. Further, in Examples 125, 126, and 128, since a large amount of crystallized and precipitated products such as oxides, sulfides, and nitrides, which affects negative impact of fatigue durability, were formed, breaking occurred before the target levels of both the roller pitching fatigue test and the notched Ono type rotation bending fatigue test were attained.

In Examples 7, 9 to 12, and 61 to 69 shown in Tables 5A and 5B, the chemical compositions are within the range of the chemical composition of the present invention. In addition, in the comparative examples of Examples 61 to 69, the gas nitriding conditions or the induction hardening conditions are derived from the conditions suggested in the present invention. As for the steels of Examples 61 to 69, steels with the same steel numbers in Tables 1A, 1B, and 1C were used. In Examples 61 to 67, while the surface fatigue strength satisfied a life of a durability target at 10000000 cycles, the bending fatigue strength could not reach the durability target in all of the Examples. In Examples 68 and 69, both the surface fatigue strength and the bending fatigue strength could not reach the durability targets.

In Examples 76, 78 to 81, and 130 to 141 shown in Table 8A, the chemical compositions are within the range of the chemical composition of the present invention. In addition, in the comparative examples of Examples 130 to 138, the gas nitriding conditions or the induction hardening conditions deviate from the conditions suggested in the present invention. As for the steels of Examples 130 to 141, steels with the same steel numbers in Tables 1A, 1B, and 1C were used. In Examples 130 to 136, while the surface fatigue strength satisfied a life of a durability target at 10000000 cycles, the bending fatigue strength could not reach the durability target in all of the Examples. In Example 137, due to the fact that the treatment time of the gas nitriding condition is short, the iron nitride layer 3 was not formed and both the surface fatigue strength and the bending fatigue strength could not reach the durability targets. In Example 138, due to the fact that the treatment temperature of the gas nitriding condition is low, the iron nitride layer 3 was not formed and both the surface fatigue strength and the bending fatigue strength could not reach the durability targets. In Example 139, due to the fact that the heat treatment temperature in a steam atmosphere is high, a large number of cracks were initiated in magnetite, a uniform coating film could not be formed and the effect of the magnetite coating film 2 was not exhibited. Therefore, the bending fatigue strength could not reach the durability target under the stress condition of 750 MPa. In Examples 140 and 141, due to the fact that the heat treatment temperature in a steam atmosphere is low, or the heat treatment time is short, magnetite having a sufficient thickness could not be obtained. Therefore, the bending fatigue strength could not reach the durability target under the stress condition of 750 MPa.

TABLE 1A

| Steel No. | Class | Chemical composition (mass %) | | | | | | | | |
|---|---|---|---|---|---|---|---|---|---|---|
| | | C | Si | Mn | P | S | Al | Cr | O | N |
| a | Invention example | 0.35 | 0.20 | 0.88 | 0.014 | 0.007 | 0.010 | 0.12 | 0.001 | 0.0040 |
| b | Invention example | 0.54 | 0.10 | 1.20 | 0.011 | 0.010 | 0.022 | 0.05 | 0.003 | 0.0042 |
| c | Invention example | 0.57 | 1.35 | 0.81 | 0.016 | 0.009 | 0.027 | 0.08 | 0.004 | 0.0050 |
| d | Invention example | 0.60 | 1.96 | 0.36 | 0.014 | 0.006 | 0.035 | 0.15 | 0.003 | 0.0042 |
| e | Invention example | 0.36 | 0.20 | 0.86 | 0.008 | 0.009 | 0.030 | 1.23 | 0.004 | 0.0050 |
| f | Invention example | 0.55 | 0.06 | 1.45 | 0.010 | 0.011 | 0.250 | 0.08 | 0.004 | 0.0045 |
| g | Invention example | 0.38 | 0.25 | 0.68 | 0.010 | 0.011 | 0.126 | 1.78 | 0.002 | 0.0045 |
| h | Invention example | 0.55 | 0.05 | 1.49 | 0.005 | 0.011 | 0.300 | 0.09 | 0.001 | 0.0046 |
| i | Invention example | 0.55 | 0.25 | 0.81 | 0.015 | 0.005 | 0.030 | 0.08 | 0.002 | 0.0041 |
| j | Invention example | 0.53 | 0.25 | 0.75 | 0.015 | 0.011 | 0.008 | 0.20 | 0.004 | 0.0034 |
| k | Invention example | 0.55 | 0.20 | 0.88 | 0.014 | 0.010 | 0.030 | 0.09 | 0.003 | 0.0041 |
| l | Invention example | 0.55 | 0.70 | 0.72 | 0.013 | 0.012 | 0.015 | 0.16 | 0.003 | 0.0034 |
| m | Invention example | 0.45 | 0.25 | 0.90 | 0.015 | 0.012 | 0.015 | 0.15 | 0.002 | 0.0051 |
| n | Invention example | 0.56 | 0.20 | 0.86 | 0.013 | 0.010 | 0.040 | 0.12 | 0.002 | 0.0039 |
| o | Invention example | 0.49 | 0.27 | 0.85 | 0.015 | 0.043 | 0.002 | 0.16 | 0.003 | 0.0051 |
| p | Invention example | 0.55 | 0.34 | 0.80 | 0.015 | 0.009 | 0.101 | 1.21 | 0.005 | 0.0046 |
| q | Invention example | 0.60 | 0.20 | 0.88 | 0.013 | 0.011 | 0.033 | 0.11 | 0.005 | 0.0039 |
| r | Invention example | 0.56 | 0.31 | 0.80 | 0.013 | 0.010 | 0.220 | 0.18 | 0.004 | 0.0035 |
| s | Invention example | 0.45 | 0.25 | 0.88 | 0.015 | 0.020 | 0.050 | 0.15 | 0.003 | 0.0046 |
| t | Invention example | 0.57 | 0.15 | 0.90 | 0.013 | 0.010 | 0.031 | 1.03 | 0.004 | 0.0041 |
| u | Invention example | 0.60 | 0.25 | 0.80 | 0.015 | 0.030 | 0.050 | 0.09 | 0.003 | 0.0043 |
| v | Invention example | 0.56 | 0.10 | 0.90 | 0.015 | 0.012 | 0.050 | 1.12 | 0.003 | 0.0045 |
| w | Invention example | 0.55 | 0.25 | 0.69 | 0.013 | 0.007 | 0.020 | 0.08 | 0.002 | 0.0052 |
| x | Invention example | 0.53 | 0.25 | 0.92 | 0.014 | 0.030 | 0.031 | 0.12 | 0.003 | 0.0048 |
| y | Invention example | 0.56 | 0.20 | 0.81 | 0.015 | 0.005 | 0.051 | 0.07 | 0.003 | 0.0045 |
| z | Invention example | 0.55 | 0.25 | 0.95 | 0.014 | 0.005 | 0.020 | 0.05 | 0.003 | 0.0052 |
| aa | Invention example | 0.55 | 0.80 | 0.96 | 0.015 | 0.010 | 0.019 | 0.06 | 0.003 | 0.0048 |
| ab | Invention example | 0.55 | 0.25 | 0.93 | 0.014 | 0.013 | 0.019 | 0.16 | 0.004 | 0.0051 |
| ac | Invention example | 0.53 | 0.25 | 0.78 | 0.015 | 0.008 | 0.016 | 0.13 | 0.005 | 0.0040 |
| ad | Invention example | 0.51 | 0.20 | 0.89 | 0.014 | 0.006 | 0.041 | 0.08 | 0.005 | 0.0051 |
| ae | Invention example | 0.55 | 0.25 | 0.85 | 0.015 | 0.011 | 0.035 | 0.16 | 0.004 | 0.0046 |
| af | Invention example | 0.50 | 1.40 | 0.36 | 0.015 | 0.010 | 0.041 | 0.21 | 0.003 | 0.0039 |
| ag | Invention example | 0.53 | 0.25 | 0.89 | 0.014 | 0.040 | 0.150 | 0.13 | 0.003 | 0.0035 |
| ah | Invention example | 0.56 | 0.23 | 0.79 | 0.013 | 0.012 | 0.120 | 0.07 | 0.002 | 0.0046 |
| ai | Invention example | 0.55 | 0.21 | 0.81 | 0.015 | 0.011 | 0.015 | 0.13 | 0.004 | 0.0041 |
| aj | Invention example | 0.53 | 0.05 | 1.46 | 0.013 | 0.010 | 0.320 | 0.14 | 0.003 | 0.0051 |
| ak | Invention example | 0.55 | 0.25 | 0.80 | 0.015 | 0.020 | 0.120 | 0.06 | 0.002 | 0.0043 |
| al | Invention example | 0.53 | 0.20 | 0.80 | 0.015 | 0.011 | 0.003 | 0.16 | 0.003 | 0.0045 |
| am | Invention example | 0.56 | 0.35 | 0.85 | 0.013 | 0.010 | 0.020 | 0.16 | 0.003 | 0.0035 |
| an | Invention example | 0.55 | 1.20 | 0.50 | 0.014 | 0.005 | 0.034 | 0.20 | 0.002 | 0.0046 |
| ao | Invention example | 0.53 | 0.05 | 0.40 | 0.013 | 0.012 | 0.002 | 0.46 | 0.002 | 0.0048 |
| ap | Invention example | 0.37 | 1.95 | 0.90 | 0.013 | 0.011 | 0.490 | 0.81 | 0.003 | 0.0045 |
| aq | Invention example | 0.53 | 0.20 | 0.83 | 0.009 | 0.010 | 0.015 | 0.12 | 0.005 | 0.0052 |
| ar | Invention example | 0.55 | 0.25 | 0.79 | 0.011 | 0.020 | 0.033 | 0.05 | 0.005 | 0.0048 |

TABLE 1A-continued

| Steel No. | Class | Chemical composition (mass %) | | | | | | | | |
|---|---|---|---|---|---|---|---|---|---|---|
| | | C | Si | Mn | P | S | Al | Cr | O | N |
| as | Invention example | 0.53 | 0.90 | 0.85 | 0.015 | 0.010 | 0.030 | 0.78 | 0.004 | 0.0039 |
| at | Invention example | 0.55 | 0.26 | 0.82 | 0.008 | 0.020 | 0.022 | 0.30 | 0.003 | 0.0035 |

TABLE 1B

| Steel No. | Class | Chemical composition (mass %) | | | | | | | |
|---|---|---|---|---|---|---|---|---|---|
| | | B | W | Mo | V | Nb | Ti | Zr | Sb |
| a | Invention example | | | | | | | | |
| b | Invention example | | | | | | | | |
| c | Invention example | | | | | | | | |
| d | Invention example | 0.0025 | | | | | | | |
| e | Invention example | | | | | | | | |
| f | Invention example | | | | | | | | |
| g | Invention example | 0.0005 | | | | | | | |
| h | Invention example | 0.0010 | | 0.50 | | | 0.02 | | |
| i | Invention example | 0.0008 | | | 0.20 | | | | |
| j | Invention example | | | | | 0.01 | | | |
| k | Invention example | 0.0005 | | 0.08 | 0.55 | | 0.03 | | |
| l | Invention example | 0.0020 | | | | 0.06 | | | |
| m | Invention example | 0.0025 | | | 0.50 | | | | |
| n | Invention example | 0.0005 | | | | | 0.17 | | |
| o | Invention example | 0.0011 | | | 0.09 | | 0.05 | | |
| p | Invention example | 0.0015 | | | 0.50 | 0.005 | | | |
| q | Invention example | 0.0006 | | | | 0.15 | 0.006 | | |
| r | Invention example | 0.0003 | | 0.30 | 0.08 | | | 0.0010 | |
| s | Invention example | 0.0009 | 0.003 | | | | | | |
| t | Invention example | 0.0004 | 0.03 | | | | | 0.01 | |
| u | Invention example | | 0.03 | | | | 0.01 | | |
| v | Invention example | 0.0015 | 0.09 | 0.09 | 0.15 | 0.006 | 0.03 | | |
| w | Invention example | 0.0011 | | | 0.10 | 0.04 | 0.04 | | |
| x | Invention example | | | | | | | | 0.09 |
| y | Invention example | 0.0008 | | | | | 0.01 | | |
| z | Invention example | 0.0012 | | | | | | 0.0007 | |
| aa | Invention example | | | | | | | | 0.05 |
| ab | Invention example | 0.0006 | | | 0.25 | | | | |
| ac | Invention example | 0.0008 | | | | | | | 0.001 |
| ad | Invention example | 0.0015 | | | | | 0.01 | 0.05 | |
| ae | Invention example | 0.0014 | | | 0.20 | | | | |
| af | Invention example | 0.0025 | | 0.60 | 0.09 | 0.04 | 0.03 | | |
| ag | Invention example | | | | 0.20 | 0.01 | 0.03 | 0.02 | |
| ah | Invention example | | | | | | 0.10 | | |
| ai | Invention example | 0.0012 | | | | | 0.12 | | |
| aj | Invention example | 0.0008 | 0.45 | 0.15 | | | | 0.03 | |
| ak | Invention example | 0.0012 | | 0.05 | 0.10 | | 0.10 | | |
| al | Invention example | 0.0007 | 0.01 | 0.10 | 0.15 | 0.01 | 0.01 | 0.0010 | |
| am | Invention example | | | | 0.20 | 0.02 | | | |
| an | Invention example | | | 0.10 | 0.20 | | | 0.04 | |
| ao | Invention example | | | 0.07 | 0.15 | | 0.03 | | |
| ap | Invention example | 0.0008 | 0.005 | 0.10 | 0.10 | 0.02 | 0.02 | 0.01 | |
| aq | Invention example | 0.0008 | | | | | | | |
| ar | Invention example | 0.0012 | | | | | 0.03 | | |
| as | Invention example | 0.0025 | | | | | 0.10 | | |
| at | Invention example | | | | | | | | |

TABLE 1C

| Steel No. | Class | Chemical composition (mass %) | | | | | | Flaw determination result |
|---|---|---|---|---|---|---|---|---|
| | | Sn | Ni | Cu | Ca | Mg | Te | |
| a | Invention example | | | | | | | No flaws |
| b | Invention example | | | | | | | No flaws |
| c | Invention example | | | | | | | No flaws |
| d | Invention example | | | | | | | No flaws |
| e | Invention example | | | | | | | No flaws |
| f | Invention example | | 1.95 | 0.30 | | | | No flaws |

TABLE 1C-continued

| Steel No. | Class | Chemical composition (mass %) | | | | | Flaw determination result |
|---|---|---|---|---|---|---|---|
| | | Sn | Ni | Cu | Ca | Mg | Te | |
| g | Invention example | | | | | | | No flaws |
| h | Invention example | | | | | | | No flaws |
| i | Invention example | | | | | | | No flaws |
| j | Invention example | | | | | | | No flaws |
| k | Invention example | | | | | | | No flaws |
| l | Invention example | | | | | | | No flaws |
| m | Invention example | | | | | | | No flaws |
| n | Invention example | | | | | | | No flaws |
| o | Invention example | | | | | | | No flaws |
| p | Invention example | | | | | | | No flaws |
| q | Invention example | | | | | | | No flaws |
| r | Invention example | | | | | | | No flaws |
| s | Invention example | | | | | | | No flaws |
| t | Invention example | | | | | | | No flaws |
| u | Invention example | | | | | | | No flaws |
| v | Invention example | | 1.40 | 0.35 | | | | No flaws |
| w | Invention example | | 0.55 | 0.30 | | | | No flaws |
| x | Invention example | | | | 0.0007 | | | No flaws |
| y | Invention example | 0.08 | | | 0.006 | | | No flaws |
| z | Invention example | 0.09 | | | | | 0.0011 | No flaws |
| aa | Invention example | | | | 0.0010 | | 0.0006 | No flaws |
| ab | Invention example | 0.0003 | | | 0.005 | | | No flaws |
| ac | Invention example | | | | | 0.006 | | No flaws |
| ad | Invention example | 0.05 | 0.11 | 0.15 | | | | No flaws |
| ae | Invention example | | 0.10 | 0.15 | | | 0.070 | No flaws |
| af | Invention example | | | | 0.005 | | | No flaws |
| ag | Invention example | | 1.50 | 0.28 | | 0.0005 | | No flaws |
| ah | Invention example | | | | | | 0.06 | No flaws |
| ai | Invention example | | | | 0.009 | | | No flaws |
| aj | Invention example | | | | 0.001 | | | No flaws |
| ak | Invention example | | | | | 0.0005 | 0.0006 | No flaws |
| al | Invention example | | 0.80 | 0.20 | 0.0006 | 0.0006 | 0.008 | No flaws |
| am | Invention example | | | | | | 0.10 | No flaws |
| an | Invention example | | 1.95 | 1.30 | | | | No flaws |
| ao | Invention example | | 0.80 | 0.80 | | | | No flaws |
| ap | Invention example | | 0.30 | 0.13 | | | | No flaws |
| aq | Invention example | | 0.85 | 0.70 | | | | No flaws |
| ar | Invention example | | 0.20 | 0.13 | | | | No flaws |
| as | Invention example | | | 0.11 | | | | No flaws |
| at | Invention example | | | 0.20 | | | | No flaws |

40

TABLE 2A

| | | | Nitriding | | | Induction hardening condition | | | |
|---|---|---|---|---|---|---|---|---|---|
| Example | Steel No. | Class | Temperature (° C.) | Time (hr) | Nitriding potential $K_N$ (—) | Hardening temperature (° C.) | Heating time (s) | Volume fraction of $Fe_4N$ (%) | Thickness of ironnitride layer (μm) |
| 1 | a | Invention example | 580 | 2.0 | 0.5 | 930 | 5 | More than 90% | 25 |
| 2 | b | Invention example | 580 | 2.0 | 0.6 | 950 | 5 | More than 90% | 27 |
| 3 | c | Invention example | 595 | 2.0 | 0.5 | 930 | 5 | More than 90% | 2 |
| 4 | d | Invention example | 600 | 1.0 | 0.6 | 980 | 4 | More than 90% | 1 |
| 5 | e | Invention example | 580 | 5.0 | 0.6 | 1000 | 2 | More than 90% | 1 |
| 6 | f | Invention example | 600 | 5.0 | 0.5 | 930 | 7 | More than 85% | 41 |
| 7 | g | Invention example | 570 | 5.0 | 0.7 | 950 | 5 | More than 90% | 1 |
| 8 | h | Invention example | 600 | 2.0 | 0.5 | 930 | 3 | More than 85% | 31 |
| 9 | i | Invention example | 600 | 3.0 | 0.6 | 980 | 3 | More than 85% | 22 |
| 10 | j | Invention example | 580 | 1.0 | 0.6 | 1000 | 2 | More than 90% | 17 |
| 11 | k | Invention example | 600 | 1.5 | 0.6 | 930 | 3 | More than 85% | 28 |
| 12 | l | Invention example | 600 | 2.0 | 0.5 | 950 | 3 | More than 85% | 35 |
| 13 | m | Invention example | 510 | 35.0 | 1.6 | 930 | 3 | More than 90% | 16 |
| 14 | n | Invention example | 600 | 2.5 | 0.5 | 980 | 3 | More than 85% | 37 |
| 15 | o | Invention example | 550 | 4.0 | 1.0 | 985 | 2 | More than 90% | 25 |
| 16 | p | Invention example | 525 | 16.0 | 1.3 | 930 | 2 | More than 90% | 3 |
| 17 | q | Invention example | 600 | 2.0 | 0.5 | 990 | 3 | More than 85% | 39 |
| 18 | r | Invention example | 600 | 2.0 | 0.6 | 1000 | 2 | More than 85% | 38 |
| 19 | s | Invention example | 500 | 35.0 | 2.0 | 930 | 8 | More than 90% | 10 |
| 20 | t | Invention example | 580 | 3.0 | 0.6 | 930 | 8 | More than 90% | 5 |
| 21 | u | Invention example | 600 | 0.5 | 0.5 | 930 | 9 | More than 90% | 14 |
| 22 | v | Invention example | 580 | 3.0 | 0.6 | 930 | 8 | More than 90% | 3 |

TABLE 2A-continued

| | | | Nitriding | | | Induction hardening condition | | | |
|---|---|---|---|---|---|---|---|---|---|
| Example | Steel No. | Class | Temperature (° C.) | Time (hr) | Nitriding potential $K_N$ (—) | Hardening temperature (° C.) | Heating time (s) | Volume fraction of $Fe_4N$ (%) | Thickness of ironnitride layer (μm) |
| 23 | w | Invention example | 600 | 2.0 | 0.5 | 930 | 7 | More than 90% | 36 |
| 24 | x | Invention example | 580 | 2.5 | 0.6 | 1000 | 1 | More than 90% | 32 |
| 25 | y | Invention example | 550 | 16.0 | 1.0 | 930 | 8 | More than 90% | 25 |
| 26 | z | Invention example | 550 | 16.0 | 1.2 | 930 | 5 | More than 90% | 26 |
| 27 | aa | Invention example | 550 | 5.0 | 1.0 | 930 | 5 | More than 90% | 25 |
| 28 | ab | Invention example | 540 | 20.0 | 1.2 | 985 | 2 | More than 90% | 14 |
| 29 | ac | Invention example | 585 | 5.0 | 0.6 | 930 | 5 | More than 90% | 39 |
| 30 | ad | Invention example | 550 | 5.0 | 1.0 | 990 | 3 | More than 90% | 26 |
| 31 | ae | Invention example | 600 | 2.0 | 0.5 | 930 | 6 | More than 90% | 40 |
| 32 | af | Invention example | 600 | 1.0 | 0.6 | 930 | 5 | More than 85% | 1 |
| 33 | ag | Invention example | 500 | 35.0 | 2.0 | 930 | 5 | More than 90% | 8 |
| 34 | ah | Invention example | 600 | 1.5 | 0.6 | 975 | 2 | More than 85% | 20 |
| 35 | ai | Invention example | 580 | 3.0 | 0.6 | 990 | 2 | More than 90% | 19 |
| 36 | aj | Invention example | 550 | 20.0 | 1.0 | 975 | 2 | More than 90% | 14 |
| 37 | ak | Invention example | 600 | 2.0 | 0.6 | 1000 | 1 | More than 90% | 28 |
| 38 | al | Invention example | 550 | 10.0 | 0.9 | 1000 | 1 | More than 90% | 11 |
| 39 | am | Invention example | 520 | 16.0 | 1.6 | 930 | 3 | More than 90% | 8 |
| 40 | an | Invention example | 600 | 2.0 | 0.6 | 975 | 3 | More than 85% | 2 |
| 41 | ao | Invention example | 510 | 30.0 | 1.6 | 1000 | 1 | More than 90% | 10 |
| 42 | ap | Invention example | 580 | 5.0 | 0.6 | 1000 | 2 | More than 90% | 1 |
| 43 | aq | Invention example | 590 | 3.0 | 0.6 | 930 | 10 | More than 85% | 24 |
| 44 | ar | Invention example | 580 | 2.0 | 0.6 | 930 | 9 | More than 90% | 21 |
| 45 | as | Invention example | 580 | 2.0 | 0.6 | 930 | 9 | More than 90% | 1 |
| 46 | at | Invention example | 595 | 2.0 | 0.5 | 950 | 5 | More than 90% | 26 |

TABLE 2B

| | | | After induction hardening | | Surface fatigue strength evaluation Roller pitching | Bending fatigue strength evaluation Notched Ono type |
|---|---|---|---|---|---|---|
| Example | Steel No. | Class | hardness after tempering at 300° C. (—) | Number of pores at surface (pores/mm$^2$) | fatigue test $10^7$ cycle durability (stress: 3500 MPa) | rotation bending fatigue test $10^7$ cycle durability (stress: 700 MPa) |
| 1 | a | Invention example | 721 | Less than 500 | Durable | Durable |
| 2 | b | Invention example | 756 | Less than 500 | Durable | Durable |
| 3 | c | Invention example | 680 | $10^0$ order | Durable | Durable |
| 4 | d | Invention example | 702 | $10^0$ order | Durable | Durable |
| 5 | e | Invention example | 698 | $10^0$ order | Durable | Durable |
| 6 | f | Invention example | 692 | Less than 500 | Durable | Durable |
| 7 | g | Invention example | 702 | $10^0$ order | Durable | Durable |
| 8 | h | Invention example | 698 | Less than 500 | Durable | Durable |
| 9 | i | Invention example | 675 | Less than 500 | Durable | Durable |
| 10 | j | Invention example | 702 | Less than 500 | Durable | Durable |
| 11 | k | Invention example | 698 | Less than 500 | Durable | Durable |
| 12 | l | Invention example | 692 | Less than 500 | Durable | Durable |
| 13 | m | Invention example | 702 | Less than 500 | Durable | Durable |
| 14 | n | Invention example | 698 | Less than 500 | Durable | Durable |
| 15 | o | Invention example | 679 | Less than 500 | Durable | Durable |
| 16 | p | Invention example | 669 | $10^0$ order | Durable | Durable |
| 17 | q | Invention example | 705 | Less than 500 | Durable | Durable |
| 18 | r | Invention example | 679 | Less than 500 | Durable | Durable |
| 19 | s | Invention example | 669 | $10^1$ order | Durable | Durable |
| 20 | t | Invention example | 690 | $10^0$ order | Durable | Durable |
| 21 | u | Invention example | 679 | $10^1$ order | Durable | Durable |
| 22 | v | Invention example | 679 | $10^0$ order | Durable | Durable |
| 23 | w | Invention example | 669 | Less than 500 | Durable | Durable |
| 24 | x | Invention example | 690 | Less than 500 | Durable | Durable |
| 25 | y | Invention example | 679 | Less than 500 | Durable | Durable |
| 26 | z | Invention example | 655 | Less than 500 | Durable | Durable |
| 27 | aa | Invention example | 653 | Less than 500 | Durable | Durable |
| 28 | ab | Invention example | 701 | $10^1$ order | Durable | Durable |
| 29 | ac | Invention example | 689 | Less than 500 | Durable | Durable |
| 30 | ad | Invention example | 680 | Less than 500 | Durable | Durable |
| 31 | ae | Invention example | 689 | Less than 500 | Durable | Durable |
| 32 | af | Invention example | 694 | $10^0$ order | Durable | Durable |
| 33 | ag | Invention example | 701 | $10^1$ order | Durable | Durable |
| 34 | ah | Invention example | 653 | $10^1$ order | Durable | Durable |
| 35 | ai | Invention example | 655 | $10^1$ order | Durable | Durable |
| 36 | aj | Invention example | 653 | $10^1$ order | Durable | Durable |
| 37 | ak | Invention example | 701 | Less than 500 | Durable | Durable |

TABLE 2B-continued

| Example | Steel No. | Class | After induction hardening hardness after tempering at 300° C. (—) | After induction hardening Number of pores at surface (pores/mm²) | Surface fatigue strength evaluation Roller pitching fatigue test 10⁷ cycle durability (stress: 3500 MPa) | Bending fatigue strength evaluation Notched Ono type rotation bending fatigue test 10⁷ cycle durability (stress: 700 MPa) |
|---|---|---|---|---|---|---|
| 38 | al | Invention example | 689 | $10^1$ order | Durable | Durable |
| 39 | am | Invention example | 694 | $10^1$ order | Durable | Durable |
| 40 | an | Invention example | 701 | $10^0$ order | Durable | Durable |
| 41 | ao | Invention example | 653 | $10^1$ order | Durable | Durable |
| 42 | ap | Invention example | 655 | $10^0$ order | Durable | Durable |
| 43 | aq | Invention example | 653 | $10^1$ order | Durable | Durable |
| 44 | ar | Invention example | 701 | $10^1$ order | Durable | Durable |
| 45 | as | Invention example | 659 | $10^0$ order | Durable | Durable |
| 46 | at | Invention example | 680 | $10^1$ order | Durable | Durable |

TABLE 3

| Steel No. | Class | C | Si | Mn | P | S | Al | Cr | O | N | B | W | Mo |
|---|---|---|---|---|---|---|---|---|---|---|---|---|---|
| ba | Comparative example | 0.34 | 1.23 | 0.80 | 0.030 | 0.013 | 0.015 | 0.15 | 0.005 | 0.0052 | | | |
| bb | Comparative example | 0.50 | 0.80 | 0.30 | 0.029 | 0.022 | 0.025 | 0.15 | 0.001 | 0.0040 | 0.0010 | | |
| bc | Comparative example | 0.50 | 0.25 | 0.55 | 0.010 | 0.022 | 0.550 | 0.11 | 0.005 | 0.0130 | 0.0011 | | |
| bd | Comparative example | 0.63 | 0.25 | 0.95 | 0.016 | 0.013 | 0.074 | 0.49 | 0.002 | 0.0055 | 0.0003 | | |
| be | Comparative example | 0.32 | 0.75 | 1.60 | 0.020 | 0.019 | 0.051 | 1.21 | 0.002 | 0.0046 | | | 0.10 |
| bf | Comparative example | 0.55 | 1.10 | 1.55 | 0.019 | 0.008 | 0.098 | 0.33 | 0.005 | 0.0051 | 0.0030 | 0.06 | 0.20 |
| bg | Comparative example | 0.53 | 1.03 | 0.80 | 0.010 | 0.013 | 0.020 | 0.03 | 0.005 | 0.0048 | | | 0.10 |
| bh | Comparative example | 0.55 | 0.25 | 0.88 | 0.008 | 0.012 | 0.040 | 0.30 | 0.003 | 0.0055 | 0.0005 | 0.10 | |
| bi | Comparative example | 0.44 | 0.68 | 1.23 | 0.025 | 0.008 | 0.013 | 0.88 | 0.003 | 0.0043 | 0.0003 | | |
| bj | Comparative example | 0.50 | 0.15 | 1.20 | 0.014 | 0.012 | <0.001 | 0.10 | 0.003 | 0.0055 | 0.0051 | 0.15 | 0.45 |
| bk | Comparative example | 0.50 | 0.45 | 1.20 | 0.013 | 0.011 | 0.026 | 0.11 | 0.006 | 0.0054 | | | |
| bl | Comparative example | 0.30 | 0.20 | 1.45 | 0.031 | 0.015 | 0.052 | 2.10 | 0.003 | 0.0060 | 0.0005 | | |
| bm | Comparative example | 0.50 | 2.05 | 1.49 | 0.015 | 0.055 | 0.050 | 0.12 | 0.001 | 0.0044 | | | 0.10 |
| bn | Comparative example | 0.45 | 0.01 | 0.25 | 0.015 | 0.015 | 0.030 | 0.13 | 0.002 | 0.0055 | 0.0010 | | |

| Steel No. | V | Nb | Ti | Zr | Sb | Sn | Ni | Cu | Ca | Mg | Te | Flaw determination result |
|---|---|---|---|---|---|---|---|---|---|---|---|---|
| ba | | | | | | | | | | | | No flaws |
| bb | | 0.02 | | | | | | | | | | No flaws |
| bc | | 0.01 | | | | | | 0.12 | | | | No flaws |
| bd | | | | | | | 0.20 | 0.13 | | | | No flaws |
| be | 0.30 | | | | | | | | | | | No flaws |
| bf | 0.20 | | | | | | | | | | | No flaws |
| bg | | 0.04 | | | | | 0.05 | 0.13 | | | | No flaws |
| bh | 0.10 | | | | | 0.15 | | | | | | Flaws occurred |
| bi | | | 0.22 | | | | | | | | 0.10 | No flaws |
| bj | 0.20 | | | | | | | | | 0.0006 | | No flaws |
| bk | 0.10 | | | 0.02 | | | | | 0.0008 | | | No flaws |
| bl | | | 0.01 | | | | | | | | 0.10 | No flaws |
| bm | 0.30 | | | | | | 0.10 | 0.06 | | | | No flaws |
| bn | 0.51 | 0.32 | 0.01 | | | | 0.05 | 0.10 | | | | No flaws |

TABLE 4A

| Example | Steel No. | Class | Nitriding Temperature (° C.) | Time (hr) | Nitriding potential $K_N$ (—) | Induction hardening condition Hardening temperature (° C.) | Heating time (s) | Volume fraction of $Fe_4N$ (%) | Thickness of iron nitride layer (μm) |
|---|---|---|---|---|---|---|---|---|---|
| 47 | ba | Comparative example | 600 | 2.0 | 0.6 | 900 | 10 | More than 90% | 26 |
| 48 | bb | Comparative example | 550 | 1.0 | 1.0 | 920 | 8 | More than 90% | 2 |
| 49 | bc | Comparative example | 600 | 0.5 | 0.6 | 900 | 8 | More than 85% | 20 |
| 50 | bd | Comparative example | 585 | 1.0 | 1.0 | 900 | 5 | Less than 80% | 14 |
| 51 | be | Comparative example | 550 | 3.0 | 0.5 | 920 | 5 | More than 90% | 15 |
| 52 | bf | Comparative example | 585 | 2.0 | 1.0 | 920 | 5 | Less than 80% | 11 |
| 53 | bg | Comparative example | 600 | 1.0 | 0.6 | 930 | 5 | More than 85% | 24 |
| 54 | bh | Comparative example | No evaluation due to many flaws generated | | | | | | |
| 55 | bi | Comparative example | 600 | 3.0 | 1.0 | 900 | 3 | Less than 80% | 28 |
| 56 | bj | Comparative example | 600 | 2.0 | 0.5 | 920 | 5 | More than 85% | 27 |
| 57 | bk | Comparative example | 585 | 1.0 | 0.5 | 920 | 4 | More than 90% | 1 |
| 58 | bl | Comparative example | 585 | 2.0 | 0.5 | 930 | 5 | More than 90% | 1 |
| 59 | bm | Comparative example | 585 | 0.5 | 0.5 | 920 | 5 | More than 90% | 1 |
| 60 | bn | Comparative example | 585 | 2.0 | 0.5 | 900 | 8 | More than 90% | 1 |

TABLE 4B

| Example | Steel No. | Class | After induction hardening hardness after tempering at 300° C. (—) | Number of pores at surface (pores/mm²) | Surface fatigue strength evaluation Roller pitching fatigue test $10^7$ cycle durability (stress: 3500 MPa) | Bending fatigue strength evaluation Notched Ono type rotation bending fatigue test $10^7$ cycle durability (stress: 700 MPa) |
|---|---|---|---|---|---|---|
| 47 | ba | Comparative example | 611 | Less than 500 | Fracturing in middle | Fracturing in middle |
| 48 | bb | Comparative example | 710 | $10^0$ order | Fracturing in middle | Fracturing in middle |
| 49 | bc | Comparative example | 678 | Less than 500 | Fracturing in middle | Fracturing in middle |
| 50 | bd | Comparative example | 734 | More than 500 | Durable | Fracturing in middle |
| 51 | be | Comparative example | 639 | $10^1$ order | Fracturing in middle | Fracturing in middle |
| 52 | bf | Comparative example | 769 | More than 500 | Durable | Fracturing in middle |
| 53 | bg | Comparative example | 658 | Less than 500 | Fracturing in middle | Fracturing in middle |
| 54 | bh | Comparative example | No evaluation due to many flaws generated | | | |
| 55 | bi | Comparative example | 741 | More than 500 | Durable | Fracturing in middle |
| 56 | bj | Comparative example | 674 | Less than 500 | Fracturing in middle | Fracturing in middle |
| 57 | bk | Comparative example | 680 | $10^0$ order | Fracturing in middle | Fracturing in middle |
| 58 | bl | Comparative example | 639 | $10^0$ order | Fracturing in middle | Fracturing in middle |
| 59 | bm | Comparative example | 710 | $10^0$ order | Fracturing in middle | Fracturing in middle |
| 60 | bn | Comparative example | 643 | $10^0$ order | Fracturing in middle | Fracturing in middle |

TABLE 5A

| Example | Steel No. | Class | Nitriding Temperature (° C.) | Time (hr) | Nitriding potential $K_N$ (—) | Induction hardening condition Hardening temperature (° C.) | Heating time (s) | Volume fraction of $Fe_4N$ (%) | Thickness of iron nitride layer (μm) |
|---|---|---|---|---|---|---|---|---|---|
| 7 | g | Invention example | 570 | 5.0 | 0.7 | 950 | 5 | More than 90% | 1 |
| 61 | g | Comparative example | 580 | 1.0 | 1.5 | 930 | 7 | Less than 80% | 2 |
| 9 | i | Invention example | 600 | 3.0 | 0.6 | 980 | 3 | More than 90% | 32 |
| 62 | i | Comparative example | 620 | 0.5 | 0.7 | 930 | 5 | Less than 80% | 38 |
| 10 | j | Invention example | 580 | 1.0 | 0.6 | 1000 | 2 | More than 90% | 27 |
| 63 | j | Comparative example | 600 | 2.0 | 1.0 | 1010 | 3 | Less than 80% | 48 |
| 11 | k | Invention example | 600 | 1.5 | 0.6 | 930 | 3 | More than 90% | 38 |
| 64 | k | Comparative example | 600 | 3.0 | 1.0 | 930 | 5 | Less than 80% | 52 |
| 65 | k | Comparative example | 600 | 1.5 | 0.6 | 930 | 11 | More than 90% | 37 |
| 12 | l | Invention example | 600 | 2.0 | 0.5 | 950 | 3 | More than 90% | 35 |
| 66 | l | Comparative example | 600 | 2.5 | 1.0 | 950 | 4 | Less than 80% | 51 |
| 67 | l | Comparative example | 600 | 2.0 | 0.5 | 950 | 11 | More than 90% | 35 |
| 68 | g | Comparative example | 520 | 0.3 | 0.3 | 930 | 7 | No iron nitride layer | 0 |
| 69 | i | Comparative example | 450 | 0.5 | 0.8 | 900 | 6 | No iron nitride layer | 0 |

TABLE 5B

| Example No. | Steel No. | Class | After induction hardening hardness after tempering at 300° C. (—) | After induction hardening Number of pores at surface (pores/mm²) | Surface fatigue strength evaluation Roller pitching fatigue test 10⁷ cycle durability (stress: 3500 MPa) | Bending fatigue strength evaluation Notched Ono type rotation bending fatigue test 10⁷ cycle durability (stress: 700 MPa) |
|---|---|---|---|---|---|---|
| 7 | g | Invention example | 702 | 10⁰ order | Durable | Durable |
| 61 | g | Comparative example | 643 | More than 500 | Durable | Fracturing in middle |
| 9 | i | Invention example | 675 | Less than 500 | Durable | Durable |
| 62 | i | Comparative example | 623 | More than 500 | Durable | Fracturing in middle |
| 10 | j | Invention example | 702 | Less than 500 | Durable | Durable |
| 63 | j | Comparative example | 723 | More than 500 | Durable | Fracturing in middle |
| 11 | k | Invention example | 698 | Less than 500 | Durable | Durable |
| 64 | k | Comparative example | 706 | More than 500 | Durable | Fracturing in middle |
| 65 | k | Comparative example | 705 | More than 500 | Durable | Fracturing in middle |
| 12 | l | Invention example | 692 | Less than 500 | Durable | Durable |
| 66 | l | Comparative example | 698 | More than 500 | Durable | Fracturing in middle |
| 67 | l | Comparative example | 695 | | Durable | Fracturing in middle |
| 68 | g | Comparative example | 560 | 10⁰ order | Fracturing in middle | Fracturing in middle |
| 69 | i | Comparative example | 620 | 10⁰ order | Fracturing in middle | Fracturing in middle |

TABLE 6A

| Example | Steel No. | Class | Nitriding Temperature (° C.) | Nitriding Time (hr) | Nitriding potential $K_N$ (—) | Heat treatment in steam atmosphere Temperature (° C.) | Heat treatment in steam atmosphere Time (min) |
|---|---|---|---|---|---|---|---|
| 70 | a | Invention example | 580 | 2.0 | 0.5 | 500 | 40 |
| 71 | b | Invention example | 580 | 2.0 | 0.6 | 490 | 35 |
| 72 | c | Invention example | 595 | 2.0 | 0.5 | 510 | 45 |
| 73 | d | Invention example | 600 | 1.0 | 0.6 | 500 | 55 |
| 74 | e | Invention example | 580 | 5.0 | 0.6 | 530 | 35 |
| 75 | f | Invention example | 600 | 5.0 | 0.5 | 480 | 45 |
| 76 | g | Invention example | 570 | 5.0 | 0.7 | 470 | 60 |
| 77 | h | Invention example | 600 | 2.0 | 0.5 | 500 | 45 |
| 78 | i | Invention example | 600 | 3.0 | 0.6 | 510 | 40 |
| 79 | j | Invention example | 580 | 1.0 | 0.6 | 500 | 50 |
| 80 | k | Invention example | 600 | 1.5 | 0.6 | 480 | 50 |
| 81 | l | Invention example | 600 | 2.0 | 0.5 | 510 | 35 |
| 82 | m | Invention example | 510 | 35.0 | 1.6 | 490 | 40 |
| 83 | n | Invention example | 600 | 2.5 | 0.5 | 500 | 40 |
| 84 | o | Invention example | 550 | 4.0 | 1.0 | 480 | 50 |
| 85 | p | Invention example | 525 | 16.0 | 1.3 | 510 | 35 |
| 86 | q | Invention example | 600 | 2.0 | 0.5 | 500 | 45 |
| 87 | r | Invention example | 600 | 2.0 | 0.6 | 450 | 60 |
| 88 | s | Invention example | 500 | 35.0 | 2.0 | 490 | 40 |
| 89 | t | Invention example | 580 | 3.0 | 0.6 | 510 | 35 |
| 90 | u | Invention example | 600 | 0.5 | 0.5 | 510 | 40 |
| 91 | v | Invention example | 580 | 3.0 | 0.6 | 500 | 45 |
| 92 | w | Invention example | 600 | 2.0 | 0.5 | 490 | 35 |
| 93 | x | Invention example | 580 | 2.5 | 0.6 | 500 | 40 |
| 94 | y | Invention example | 550 | 16.0 | 1.0 | 520 | 35 |
| 95 | z | Invention example | 550 | 16.0 | 1.2 | 470 | 55 |
| 96 | aa | Invention example | 550 | 5.0 | 1.0 | 490 | 45 |
| 97 | ab | Invention example | 540 | 20.0 | 1.2 | 500 | 35 |
| 98 | ac | Invention example | 585 | 5.0 | 0.6 | 490 | 50 |
| 99 | ad | Invention example | 550 | 5.0 | 1.0 | 520 | 40 |
| 100 | ae | Invention example | 600 | 2.0 | 0.5 | 500 | 50 |
| 101 | af | Invention example | 600 | 1.0 | 0.6 | 510 | 40 |
| 102 | ag | Invention example | 500 | 35.0 | 2.0 | 480 | 45 |
| 103 | ah | Invention example | 600 | 1.5 | 0.6 | 490 | 45 |
| 104 | ai | Invention example | 580 | 3.0 | 0.6 | 510 | 40 |
| 105 | aj | Invention example | 550 | 20.0 | 1.0 | 470 | 55 |
| 106 | ak | Invention example | 600 | 2.0 | 0.6 | 480 | 45 |
| 107 | al | Invention example | 550 | 10.0 | 0.9 | 510 | 35 |
| 108 | am | Invention example | 520 | 16.0 | 1.6 | 500 | 40 |
| 109 | an | Invention example | 600 | 2.0 | 0.6 | 510 | 40 |
| 110 | ao | Invention example | 510 | 30.0 | 1.6 | 480 | 50 |
| 111 | ap | Invention example | 580 | 5.0 | 0.6 | 490 | 45 |

TABLE 6A-continued

| | | | Nitriding | | | Heat treatment in steam atmosphere | |
|---|---|---|---|---|---|---|---|
| Example | Steel No. | Class | Temperature (° C.) | Time (hr) | Nitriding potential $K_N$ (—) | Temperature (° C.) | Time (min) |
| 112 | aq | Invention example | 590 | 3.0 | 0.6 | 500 | 35 |
| 113 | ar | Invention example | 580 | 2.0 | 0.6 | 550 | 30 |
| 114 | as | Invention example | 580 | 2.0 | 0.6 | 490 | 45 |
| 115 | at | Invention example | 595 | 2.0 | 0.5 | 500 | 40 |

TABLE 6B

| | | | Before induction hardening Thickness of $Fe_3O_4$ coating film after heat treatment in steam atmosphere (μm) | Induction hardening condition | | | |
|---|---|---|---|---|---|---|---|
| Example | Steel No. | Class | | Hardening temperature (° C.) | Heating time (s) | Volume fraction of $Fe_4N$ (%) | Thickness of iron nitride layer (μm) |
| 70 | a | Invention example | 1.5 | 930 | 5 | More than 90% | 26 |
| 71 | b | Invention example | 1.4 | 950 | 5 | More than 90% | 25 |
| 72 | c | Invention example | 1.7 | 930 | 5 | More than 90% | 3 |
| 73 | d | Invention example | 1.4 | 980 | 4 | More than 90% | 2 |
| 74 | e | Invention example | 1.6 | 1000 | 2 | More than 90% | 1 |
| 75 | f | Invention example | 1.5 | 930 | 7 | More than 85% | 38 |
| 76 | g | Invention example | 1.4 | 950 | 5 | More than 90% | 2 |
| 77 | h | Invention example | 1.4 | 930 | 3 | More than 85% | 32 |
| 78 | i | Invention example | 1.5 | 980 | 3 | More than 85% | 23 |
| 79 | j | Invention example | 1.5 | 1000 | 2 | More than 90% | 20 |
| 80 | k | Invention example | 1.4 | 930 | 3 | More than 85% | 26 |
| 81 | l | Invention example | 1.6 | 950 | 3 | More than 85% | 33 |
| 82 | m | Invention example | 1.6 | 930 | 3 | More than 90% | 15 |
| 83 | n | Invention example | 1.5 | 980 | 3 | More than 85% | 34 |
| 84 | o | Invention example | 1.5 | 985 | 2 | More than 90% | 26 |
| 85 | p | Invention example | 1.6 | 930 | 2 | More than 90% | 2 |
| 86 | q | Invention example | 1.7 | 990 | 3 | More than 85% | 37 |
| 87 | r | Invention example | 1.1 | 1000 | 2 | More than 85% | 37 |
| 88 | s | Invention example | 1.5 | 930 | 8 | More than 90% | 12 |
| 89 | t | Invention example | 1.7 | 930 | 8 | More than 90% | 6 |
| 90 | u | Invention example | 1.7 | 930 | 9 | More than 90% | 12 |
| 91 | v | Invention example | 1.6 | 930 | 8 | More than 90% | 2 |
| 92 | w | Invention example | 1.4 | 930 | 7 | More than 90% | 35 |
| 93 | x | Invention example | 1.7 | 1000 | 1 | More than 90% | 33 |
| 94 | y | Invention example | 1.5 | 930 | 8 | More than 90% | 24 |
| 95 | z | Invention example | 1.5 | 930 | 5 | More than 90% | 23 |
| 96 | aa | Invention example | 1.2 | 930 | 5 | More than 90% | 24 |
| 97 | ab | Invention example | 1.6 | 985 | 2 | More than 90% | 16 |
| 98 | ac | Invention example | 1.7 | 930 | 5 | More than 90% | 37 |
| 99 | ad | Invention example | 1.5 | 990 | 3 | More than 90% | 26 |
| 100 | ae | Invention example | 1.5 | 930 | 6 | More than 90% | 39 |
| 101 | af | Invention example | 1.6 | 930 | 5 | More than 85% | 2 |
| 102 | ag | Invention example | 1.7 | 930 | 5 | More than 90% | 7 |
| 103 | ah | Invention example | 1.5 | 975 | 2 | More than 85% | 22 |
| 104 | ai | Invention example | 1.5 | 990 | 2 | More than 90% | 23 |
| 105 | aj | Invention example | 1.7 | 975 | 2 | More than 90% | 12 |
| 106 | ak | Invention example | 1.5 | 1000 | 1 | More than 90% | 30 |
| 107 | al | Invention example | 1.6 | 1000 | 1 | More than 90% | 13 |
| 108 | am | Invention example | 1.2 | 930 | 3 | More than 90% | 6 |
| 109 | an | Invention example | 1.7 | 975 | 3 | More than 85% | 1 |
| 110 | ao | Invention example | 1.6 | 1000 | 1 | More than 90% | 12 |
| 111 | ap | Invention example | 1.6 | 1000 | 2 | More than 90% | 3 |
| 112 | aq | Invention example | 1.5 | 930 | 10 | More than 85% | 26 |
| 113 | ar | Invention example | 2.0 | 930 | 9 | More than 90% | 22 |
| 114 | as | Invention example | 1.6 | 930 | 9 | More than 90% | 1 |
| 115 | at | Invention example | 1.4 | 950 | 5 | More than 90% | 27 |

TABLE 6C

| Example | Steel No. | Class | After induction hardening hardness after tempering at 300° C. (—) | Number of pores at surface (pores/mm²) | Surface fatigue strength evaluation Roller pitching fatigue test 10⁷ cycle durability (stress: 3500 MPa) | Bending fatigue strength evaluation Notched Ono type rotation bending fatigue test 10⁷ cycle durability (stress: 700 MPa) | Notched Ono type rotation bending fatigue test 10⁷ cycle durability (stress: 750 MPa) |
|---|---|---|---|---|---|---|---|
| 70 | a | Invention example | 703 | Less than 500 | Durable | Durable | Durable |
| 71 | b | Invention example | 752 | Less than 500 | Durable | Durable | Durable |
| 72 | c | Invention example | 687 | 10⁰ order | Durable | Durable | Durable |
| 73 | d | Invention example | 698 | 10⁰ order | Durable | Durable | Durable |
| 74 | e | Invention example | 709 | 10⁰ order | Durable | Durable | Durable |
| 75 | f | Invention example | 701 | Less than 500 | Durable | Durable | Durable |
| 76 | g | Invention example | 712 | 10⁰ order | Durable | Durable | Durable |
| 77 | h | Invention example | 706 | Less than 500 | Durable | Durable | Durable |
| 78 | i | Invention example | 671 | Less than 500 | Durable | Durable | Durable |
| 79 | j | Invention example | 689 | Less than 500 | Durable | Durable | Durable |
| 80 | k | Invention example | 710 | Less than 500 | Durable | Durable | Durable |
| 81 | l | Invention example | 706 | Less than 500 | Durable | Durable | Durable |
| 82 | m | Invention example | 720 | Less than 500 | Durable | Durable | Durable |
| 83 | n | Invention example | 715 | Less than 500 | Durable | Durable | Durable |
| 84 | o | Invention example | 689 | Less than 500 | Durable | Durable | Durable |
| 85 | p | Invention example | 678 | 10⁰ order | Durable | Durable | Durable |
| 86 | q | Invention example | 724 | Less than 500 | Durable | Durable | Durable |
| 87 | r | Invention example | 690 | Less than 500 | Durable | Durable | Durable |
| 88 | s | Invention example | 681 | 10¹ order | Durable | Durable | Durable |
| 89 | t | Invention example | 703 | 10⁰ order | Durable | Durable | Durable |
| 90 | u | Invention example | 707 | 10¹ order | Durable | Durable | Durable |
| 91 | v | Invention example | 691 | 10⁰ order | Durable | Durable | Durable |
| 92 | w | Invention example | 675 | Less than 500 | Durable | Durable | Durable |
| 93 | x | Invention example | 704 | Less than 500 | Durable | Durable | Durable |
| 94 | y | Invention example | 700 | Less than 500 | Durable | Durable | Durable |
| 95 | z | Invention example | 660 | Less than 500 | Durable | Durable | Durable |
| 96 | aa | Invention example | 672 | Less than 500 | Durable | Durable | Durable |
| 97 | ab | Invention example | 710 | 10¹ order | Durable | Durable | Durable |
| 98 | ac | Invention example | 704 | Less than 500 | Durable | Durable | Durable |
| 99 | ad | Invention example | 688 | Less than 500 | Durable | Durable | Durable |
| 100 | ae | Invention example | 690 | Less than 500 | Durable | Durable | Durable |
| 101 | af | Invention example | 699 | 10⁰ order | Durable | Durable | Durable |
| 102 | ag | Invention example | 697 | 10¹ order | Durable | Durable | Durable |
| 103 | ah | Invention example | 671 | 10¹ order | Durable | Durable | Durable |
| 104 | ai | Invention example | 681 | 10¹ order | Durable | Durable | Durable |
| 105 | aj | Invention example | 669 | 10¹ order | Durable | Durable | Durable |
| 106 | ak | Invention example | 722 | Less than 500 | Durable | Durable | Durable |
| 107 | al | Invention example | 706 | 10¹ order | Durable | Durable | Durable |
| 108 | am | Invention example | 712 | 10¹ order | Durable | Durable | Durable |
| 109 | an | Invention example | 726 | 10⁰ order | Durable | Durable | Durable |
| 110 | ao | Invention example | 668 | 10¹ order | Durable | Durable | Durable |
| 111 | ap | Invention example | 691 | 10⁰ order | Durable | Durable | Durable |
| 112 | aq | Invention example | 679 | 10¹ order | Durable | Durable | Durable |
| 113 | ar | Invention example | 722 | 10¹ order | Durable | Durable | Durable |
| 114 | as | Invention example | 678 | 10⁰ order | Durable | Durable | Durable |
| 115 | at | Invention example | 701 | 10¹ order | Durable | Durable | Durable |

TABLE 7A

| Example | Steel No. | Class | Nitriding Temperature (° C.) | Nitriding Time (hr) | Nitriding potential $K_N$ (—) | Heat treatment in steam atmosphere Temperature (° C.) | Heat treatment in steam atmosphere Time (min) | Before induction hardening Thickness of $Fe_3O_4$ coating film after heat treatment in steam atmosphere (μm) | Induction hardening condition Hardening temperature (° C.) | Heating time (s) | Volume fraction of $Fe_4N$ (%) | Thickness of iron nitride layer (μm) |
|---|---|---|---|---|---|---|---|---|---|---|---|---|
| 116 | ba | Comparative example | 600 | 2.0 | 0.6 | 530 | 45 | 1.7 | 900 | 10 | More than 90% | 25 |
| 117 | bb | Comparative example | 550 | 1.0 | 1.0 | 470 | 55 | 1.1 | 920 | 8 | More than 90% | 3 |

TABLE 7A-continued

| Example | Steel No. | Class | Nitriding Temperature (° C.) | Nitriding Time (hr) | Nitriding potential $K_N$ (—) | Heat treatment in steam atmosphere Temperature (° C.) | Time (min) | Before induction hardening Thickness of $Fe_3O_4$ coating film after heat treatment in steam atmosphere (μm) | Induction hardening condition Hardening temperature (° C.) | Heating time (s) | Volume fraction of $Fe_4N$ (%) | Thickness of iron nitride layer (μm) |
|---|---|---|---|---|---|---|---|---|---|---|---|---|
| 118 | bc | Comparative example | 600 | 0.5 | 0.6 | 450 | 60 | 1.0 | 900 | 8 | More than 85% | 22 |
| 119 | bd | Comparative example | 585 | 1.0 | 1.0 | 500 | 40 | 1.5 | 900 | 5 | Less than 80% | 12 |
| 120 | be | Comparative example | 550 | 3.0 | 0.5 | 510 | 40 | 1.5 | 920 | 5 | More than 90% | 16 |
| 121 | bf | Comparative example | 585 | 2.0 | 1.0 | 490 | 45 | 1.4 | 920 | 5 | Less than 80% | 15 |
| 122 | bg | Comparative example | 600 | 1.0 | 0.6 | 490 | 40 | 1.3 | 930 | 5 | More than 85% | 21 |
| 123 | bh | Comparative example | No evaluation due to many flaws generated | | | | | | | | | |
| 124 | bi | Comparative example | 600 | 3.0 | 1.0 | 510 | 35 | 1.4 | 900 | 3 | Less than 80% | 26 |
| 125 | bj | Comparative example | 600 | 2.0 | 0.5 | 540 | 50 | 1.7 | 920 | 5 | More than 85% | 30 |
| 126 | bk | Comparative example | 585 | 1.0 | 0.5 | 460 | 50 | 1.1 | 920 | 4 | More than 90% | 2 |
| 127 | bl | Comparative example | 585 | 2.0 | 0.5 | 470 | 60 | 1.2 | 930 | 5 | More than 90% | 1 |
| 128 | bm | Comparative example | 585 | 0.5 | 0.5 | 490 | 50 | 1.5 | 920 | 5 | More than 90% | 2 |
| 129 | bn | Comparative example | 585 | 2.0 | 0.5 | 520 | 45 | 1.6 | 900 | 8 | More than 90% | 1 |

TABLE 7B

| Example | Steel No. | Class | After induction hardening hardness after tempering at 300° C. (—) | Number of pores at surface (pores/mm$^2$) | Surface fatigue strength evaluation Roller pitching fatigue test $10^7$ cycle durability (stress: 3500 MPa) | Bending fatigue strength evaluation Notched Ono type rotation bending fatigue test $10^7$ cycle durability (stress: 700 MPa) | Notched Ono type rotation bending fatigue test $10^7$ cycle durability (stress: 750 MPa) |
|---|---|---|---|---|---|---|---|
| 116 | ba | Comparative example | 606 | Less than 500 | Fracturing in middle | Fracturing in middle | Fracturing in middle |
| 117 | bb | Comparative example | 712 | $10^0$ order | Fracturing in middle | Fracturing in middle | Fracturing in middle |
| 118 | bc | Comparative example | 687 | Less than 500 | Fracturing in middle | Fracturing in middle | Fracturing in middle |
| 119 | bd | Comparative example | 729 | More than 500 | Durable | Fracturing in middle | Fracturing in middle |
| 120 | be | Comparative example | 631 | $10^1$ order | Fracturing in middle | Fracturing in middle | Fracturing in middle |
| 121 | bf | Comparative example | 741 | More than 500 | Durable | Fracturing in middle | Fracturing in middle |
| 122 | bg | Comparative example | 659 | Less than 500 | Fracturing in middle | Fracturing in middle | Fracturing in middle |
| 123 | bh | Comparative example | No evaluation due to many flaws generated | | | | |
| 124 | bi | Comparative example | 735 | More than 500 | Durable | Fracturing in middle | Fracturing in middle |
| 125 | bj | Comparative example | 680 | Less than 500 | Fracturing in middle | Fracturing in middle | Fracturing in middle |
| 126 | bk | Comparative example | 691 | $10^0$ order | Fracturing in middle | Fracturing in middle | Fracturing in middle |
| 127 | bl | Comparative example | 641 | $10^0$ order | Fracturing in middle | Fracturing in middle | Fracturing in middle |
| 128 | bm | Comparative example | 701 | $10^0$ order | Fracturing in middle | Fracturing in middle | Fracturing in middle |
| 129 | bn | Comparative example | 639 | $10^0$ order | Fracturing in middle | Fracturing in middle | Fracturing in middle |

TABLE 8A

| Example | Steel No. | Class | Nitriding Temperature (° C.) | Nitriding Time (hr) | Nitriding potential $K_N$ (—) | Heat treatment in steam atmosphere Temperature (° C.) | Heat treatment in steam atmosphere Time (min) | Before induction hardening Thickness of $Fe_3O_4$ coating film after heat treatment in steam atmosphere (μm) | Induction hardening condition Hardening temperature (° C.) | Induction hardening condition Heating time (s) | Volume fraction of $Fe_4N$ (%) | Thickness of iron nitride layer (μm) |
|---|---|---|---|---|---|---|---|---|---|---|---|---|
| 76 | g | Invention example | 570 | 5.0 | 0.7 | 470 | 60 | 1.4 | 950 | 5 | More than 90% | 2 |
| 130 | g | Comparative example | 580 | 1.0 | 1.5 | 520 | 40 | 1.5 | 930 | 7 | Less than 80% | 3 |
| 78 | i | Invention example | 600 | 3.0 | 0.6 | 510 | 40 | 1.5 | 980 | 3 | More than 90% | 23 |
| 131 | i | Comparative example | 620 | 0.5 | 0.7 | 540 | 40 | 1.7 | 930 | 5 | Less than 80% | 35 |
| 79 | j | Invention example | 580 | 1.0 | 0.6 | 500 | 50 | 1.5 | 1000 | 2 | More than 90% | 20 |
| 132 | j | Comparative example | 600 | 2.0 | 1.0 | 480 | 40 | 1.3 | 1010 | 3 | Less than 80% | 41 |
| 80 | k | Invention example | 600 | 1.5 | 0.6 | 490 | 40 | 1.4 | 930 | 3 | More than 90% | 26 |
| 133 | k | Comparative example | 600 | 3.0 | 1.0 | 510 | 40 | 1.5 | 930 | 5 | Less than 80% | 55 |
| 134 | k | Comparative example | 600 | 1.5 | 0.6 | 520 | 35 | 1.5 | 930 | 11 | More than 90% | 32 |
| 81 | l | Invention example | 600 | 2.0 | 0.5 | 510 | 35 | 1.6 | 950 | 3 | More than 90% | 33 |
| 135 | l | Comparative example | 600 | 2.5 | 1.0 | 530 | 40 | 1.7 | 950 | 4 | Less than 80% | 52 |
| 136 | l | Comparative example | 600 | 2.0 | 0.5 | 470 | 45 | 1.3 | 950 | 11 | More than 90% | 30 |
| 137 | g | Comparative example | 520 | 0.3 | 0.3 | 490 | 50 | 1.4 | 930 | 7 | No iron nitride layer | 0 |
| 138 | i | Comparative example | 450 | 0.5 | 0.8 | 460 | 60 | 1.2 | 900 | 6 | No iron nitride layer | 0 |
| 139 | l | Invention example | 600 | 2.0 | 0.5 | 610 | 55 | 0.0 | 920 | 5 | More than 90% | 32 |
| 140 | l | Invention example | 600 | 1.0 | 0.3 | 400 | 30 | 0.0 | 930 | 5 | More than 90% | 5 |
| 141 | l | Invention example | 600 | 2.5 | 0.6 | 460 | 10 | 0.0 | 910 | 7 | More than 90% | 30 |

TABLE 8B

| Example | Steel No. | Class | After induction hardening hardness after tempering at 300° C. (—) | Number of pores at surface (pores/mm²) | Surface fatigue strength evaluation Roller pitching fatigue test $10^7$ cycle durability (stress: 3500 MPa) | Bending fatigue strength evaluation Notched Ono type rotation bending fatigue test $10^7$ cycle durability (stress: 700 MPa) | Bending fatigue strength evaluation Notched Ono type rotation bending fatigue test $10^7$ cycle durability (stress: 750 MPa) |
|---|---|---|---|---|---|---|---|
| 76 | g | Invention example | 712 | $10^0$ order | Durable | Durable | Durable |
| 130 | g | Comparative example | 642 | More than 500 | Durable | Fracturing in middle | Fracturing in middle |
| 78 | i | Invention example | 671 | Less than 500 | Durable | Durable | Durable |
| 131 | i | Comparative example | 616 | More than 500 | Durable | Fracturing in middle | Fracturing in middle |
| 79 | j | Invention example | 689 | Less than 500 | Durable | Durable | Durable |
| 132 | j | Comparative example | 717 | More than 500 | Durable | Fracturing in middle | Fracturing in middle |
| 80 | k | Invention example | 710 | Less than 500 | Durable | Durable | Durable |
| 133 | k | Comparative example | 716 | More than 500 | Durable | Fracturing in middle | Fracturing in middle |
| 134 | k | Comparative example | 720 | More than 500 | Durable | Fracturing in middle | Fracturing in middle |
| 81 | l | Invention example | 692 | Less than 500 | Durable | Durable | Durable |
| 135 | l | Comparative example | 702 | More than 500 | Durable | Fracturing in middle | Fracturing in middle |
| 136 | l | Comparative example | 681 | More than 500 | Durable | Fracturing in middle | Fracturing in middle |

TABLE 8B-continued

| | | | After induction hardening | | Surface fatigue strength evaluation | Bending fatigue strength evaluation | |
| | | | | | | Notched Ono type | Notched Ono type |
| Example | Steel No. | Class | hardness after tempering at 300° C. (—) | Number of pores at surface (pores/mm$^2$) | Roller pitching fatigue test $10^7$ cycle durability (stress: 3500 MPa) | rotation bending fatigue test $10^7$ cycle durability (stress: 700 MPa) | rotation bending fatigue test $10^7$ cycle durability (stress: 750 MPa) |
|---|---|---|---|---|---|---|---|
| 137 | g | Comparative example | 558 | $10^0$ order | Fracturing in middle | Fracturing in middle | Fracturing in middle |
| 138 | i | Comparative example | 610 | $10^0$ order | Fracturing in middle | Fracturing in middle | Fracturing in middle |
| 139 | l | Invention example | 701 | More than 500 | Durable | Durable | Fracturing in middle |
| 140 | l | Invention example | 682 | More than 500 | Durable | Durable | Fracturing in middle |
| 141 | l | Invention example | 709 | More than 500 | Durable | Durable | Fracturing in middle |

INDUSTRIAL APPLICABILITY

According to the present invention, it is possible to provide a Roughly shaped material for induction hardened components that can be applied to power transmission parts of automobiles and the like and have high surface fatigue strength and bending fatigue strength, for example, induction hardened components such as gears, continuously variable transmissions, constant velocity joints, hubs, and bearings, and a method for producing the same. Thus, the present invention significantly contributes to the higher output and lower cost of automobiles and the like.

BRIEF DESCRIPTION OF THE REFERENCE SYMBOLS

1: NITRIDING LAYER
2 MAGNETITE COATING FILM
3 IRON NITRIDE LAYER
4 NITROGEN DIFFUSION LAYER
5 PRIMARY PHASE
6 PHASE BOUNDARY
7 BASE METAL

The invention claimed is:

1. A material for induction hardened components comprising:
a steel as a base metal consisting of, as a chemical composition, by mass %,
C: 0.35% to 0.6%,
Si: 0.02% to 2.0%,
Mn: 0.35% to 1.5%,
Al: 0.001% to 0.5%,
Cr: 0.05% to 2.0%,
S: 0.0001% to 0.05%,
N: 0.003% to 0.0120%,
P: 0.03% or less,
O: 0.0050% or less,
B: 0% to 0.005%,
W: 0% to 0.5%,
Mo: 0% to 1.0%,
V: 0% to 1.0%,
Nb: 0% to 0.3%,
Ti: 0% to 0.2%,
Zr: 0% to 0.05%,
Sb: 0% to 0.1%,
Sn: 0% to 0.1%,
Cu: 0% to 2.0%,
Ni: 0% to 2.0%,
Ca: 0% to 0.01%,
Mg: 0% to 0.01%,
Te: 0% to 0.1%, and
the balance consisting of Fe and impurities,
further comprising an iron nitride layer at a surface, having a thickness of 0.1 μm to 50 μm in a depth direction;
wherein a volume fraction of a γ' phase, which is a Fe nitride, in the iron nitride layer, is 80% or more.

2. The material for induction hardened components according to claim 1, further comprising:
a magnetite coating film having a thickness of 0.1 μm to 5 μm on a surface of the iron nitride layer.

3. The material for induction hardened components according to claim 1 or 2,
wherein the steel as the base metal includes, as a chemical composition, by mass %, one or more of
B: 0.0003% to 0.005%,
W: 0.0025% to 0.5%,
Mo: 0.05% to 1.0%,
V: 0.05% to 1.0%,
Nb: 0.005% to 0.3%,
Ti: 0.005% to 0.2%,
Zr: 0.0005% to 0.05%,
Sb: 0.0005% to 0.1%,
Sn: 0.01% to 0.1%,
Cu: 0.01% to 2.0%,
Ni: 0.01% to 2.0%
Ca: 0.0005% to 0.01%,
Mg: 0.0005% to 0.01%, and
Te: 0.0005% to 0.1%.

4. An induction hardened component obtained by performing an induction hardening on the material according to claim 3.

5. The induction hardened component according to claim 4,
wherein a number of pores having an equivalent circle diameter of 0.5 μm to 1 μm in a region at a maximum depth of 5 μm from a surface of the induction hardened component is less than 500 per mm$^2$.

6. A method for producing an induction hardened component comprising:
performing an induction hardening on the material according to claim 3.

7. A method for producing a material for induction hardened components comprising:
when a gas nitriding treatment is performed on a steel having a chemical composition of the steel as a base metal according to claim 3,
adjusting a composition of an atmosphere gas including NH$_3$; and performing a gas nitriding at a temperature of 500° C. to 600° C. for 30 minutes or longer in the atmosphere gas not including $CO_2$ with a nitriding potential $K_N$ satisfying the following Expression a, $$-1.4 \times (T-773)/100 + 2.0 \geq K_N \geq -0.15 \times (T-773)/100 + 0.3 \quad \text{(a)},$$

here, $K_N = P_{NH3}/P_{H2}^{3/2}$ ($P_{NH3}$ represents a partial pressure of $NH_3$ in the atmosphere gas, and $P_{H2}$ represents a partial pressure of $H_2$ in the atmosphere gas), and T represents a gas nitriding treatment temperature (K).

8. The method for producing a material for induction hardened components according to claim 7, further comprising:
performing a heat treatment under conditions of heating at 450° C. to 550° C. for 30 minutes to 60 minutes in a steam atmosphere after performing the gas nitriding.

9. A method for producing an induction hardened component,
wherein when an induction hardening is performed on the material obtained by the production method according to claim 8, a heating time from a time when a surface temperature of the material reaches a temperature which is 50° C. lower than a hardening temperature to the induction hardening is set to be within 10 seconds, and the hardening temperature is 850° C. to 1000° C.

10. A method for producing an induction hardened component,
wherein when an induction hardening is performed on the material obtained by the production method according to claim 7, a heating time from a time when a surface temperature of the material reaches a temperature which is 50° C. lower than a hardening temperature to the induction hardening is set to be within 10 seconds, and the hardening temperature is 850° C. to 1000° C.

11. An induction hardened component obtained by performing an induction hardening on the material according to claim 1 or 2.

12. A method for producing an induction hardened component comprising:
performing an induction hardening on the material according to claim 1 or 2.

13. The induction hardened component according to claim 11,
wherein a number of pores having an equivalent circle diameter of 0.5 μm to 1 μm in a region at a maximum depth of 5 μm from a surface of the induction hardened component is less than 500 per $mm^2$.

14. A method for producing a material for induction hardened components comprising:
when a gas nitriding treatment is performed on a steel having a chemical composition of the steel as a base metal according to claim 1,
adjusting a composition of an atmosphere gas including $NH_3$; and
performing a gas nitriding at a temperature of 500° C. to 600° C. for 30 minutes or longer in the atmosphere gas not including $CO_2$ with a nitriding potential $K_N$ satisfying the following Expression a, $$-1.4 \times (T-773)/100 + 2.0 \geq K_N \geq -0.15 \times (T-773)/100 + 0.3 \quad \text{(a)},$$

here, $K_N = P_{NH3}/P_{H2}^{3/2}$ ($P_{NH3}$ represents a partial pressure of $NH_3$ in the atmosphere gas, and $P_{H2}$ represents a partial pressure of $H_2$ in the atmosphere gas), and T represents a gas nitriding treatment temperature (K).

15. The method for producing a material for induction hardened components according to claim 14, further comprising:
performing a heat treatment under conditions of heating at 450° C. to 550° C. for 30 minutes to 60 minutes in a steam atmosphere after performing the gas nitriding.

16. A method for producing an induction hardened component,
wherein when an induction hardening is performed on the material obtained by the production method according to claim 14 or 15, a heating time from a time when a surface temperature of the material reaches a temperature which is 50° C. lower than a hardening temperature to the induction hardening is set to be within 10 seconds, and the hardening temperature is 850° C. to 1000° C.

* * * * *